(12) United States Patent
Saori

(10) Patent No.: US 9,213,173 B2
(45) Date of Patent: Dec. 15, 2015

(54) ZOOM LENS SYSTEM

(71) Applicant: RICOH IMAGING COMPANY, LTD., Tokyo (JP)

(72) Inventor: Masakazu Saori, Saitama (JP)

(73) Assignee: RICOH IMAGING COMPANY, LTD., Tokyo (JP)

(*) Notice: Subject to any disclaimer, the term of this patent is extended or adjusted under 35 U.S.C. 154(b) by 26 days.

(21) Appl. No.: 14/136,020

(22) Filed: Dec. 20, 2013

(65) Prior Publication Data

US 2014/0177067 A1    Jun. 26, 2014

(30) Foreign Application Priority Data

Dec. 26, 2012 (JP) ................ 2012-282238

(51) Int. Cl.
*G02B 15/177* (2006.01)
*G02B 15/14* (2006.01)
*G02B 27/64* (2006.01)

(52) U.S. Cl.
CPC .............. *G02B 15/177* (2013.01); *G02B 15/14* (2013.01); *G02B 27/646* (2013.01)

(58) Field of Classification Search
CPC .................................................. G02B 15/177
USPC ........................................ 359/686, 680–682
See application file for complete search history.

(56) References Cited

U.S. PATENT DOCUMENTS

| 4,591,235 | A  | * | 5/1986  | Tokumaru et al. ............ 359/686 |
| 6,317,271 | B1 |   | 11/2001 | Sensui |
| 6,320,698 | B1 |   | 11/2001 | Suzuki |

| 2007/0201142 | A1 | * | 8/2007 | Narikawa et al. ............. 359/680 |
| 2009/0002841 | A1 |   | 1/2009 | Yamamoto et al. |
| 2009/0059388 | A1 | * | 3/2009 | Miyata et al. ................. 359/686 |
| 2010/0238560 | A1 |   | 9/2010 | Fujimoto |

FOREIGN PATENT DOCUMENTS

| JP | 2000-75205   | 3/2000  |
| JP | 2008-216881  | 9/2008  |
| JP | 2009-014761  | 1/2009  |
| JP | 2009-271165  | 11/2009 |
| JP | 2010-217535  | 9/2010  |

OTHER PUBLICATIONS

E.P.O. Office action, mail date is Apr. 1, 2014.
Search report from E.P.O, mail date is Jun. 13, 2014.

* cited by examiner

*Primary Examiner* — Jordan Schwartz
(74) *Attorney, Agent, or Firm* — Greenblum & Bernstein, P.L.C.

(57) ABSTRACT

A zoom lens system includes a negative first lens group, a positive second lens group, a negative third lens group, and a positive fourth lens group. Upon zooming from the short to the long focal length extremities, the distance between the first and second lens groups decreases, the distance between the second and third lens groups increases, and the distance between the third and fourth lens groups decreases. The following conditions (1) and (2) are satisfied:

$$-2.50 < f1/f2 < -1.57 \quad (1),$$

and $$f3/f3B < -0.1 \quad (2),$$

wherein
f1, f2 and f3 designate the focal lengths of the first, second and third lens groups, respectively, and f3B designates the focal length of a bonding surface in the cemented lens of the third lens group.

17 Claims, 25 Drawing Sheets

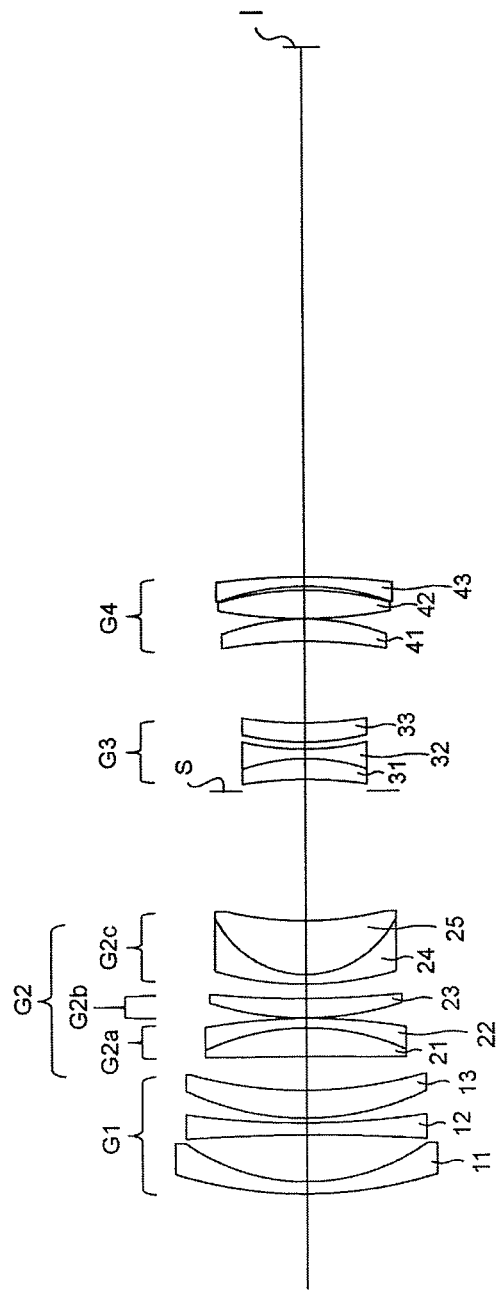

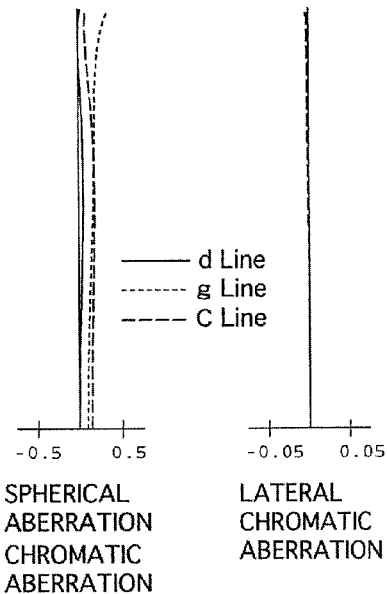
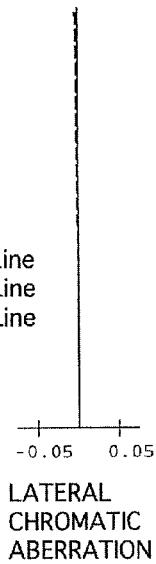
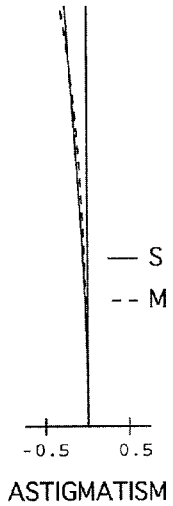
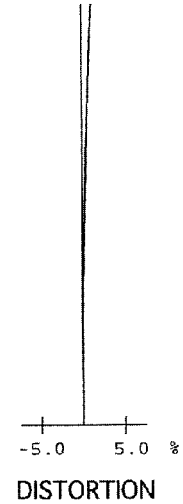
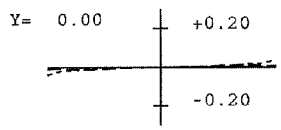
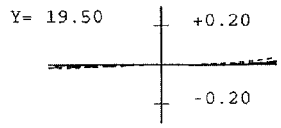
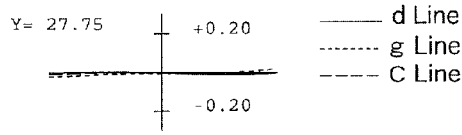

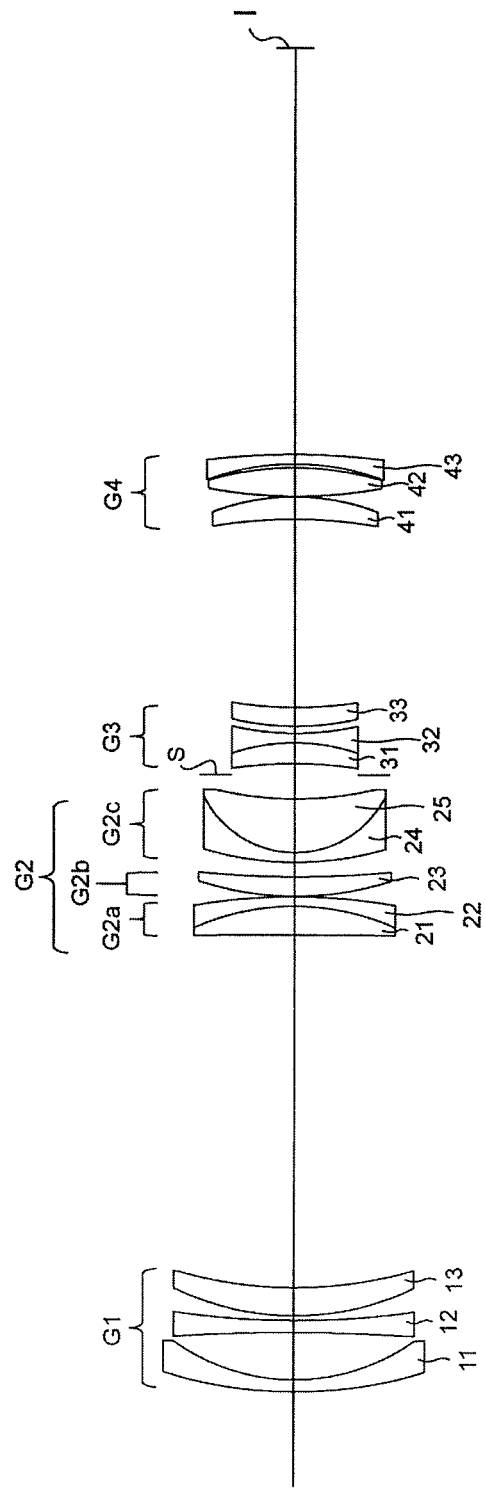

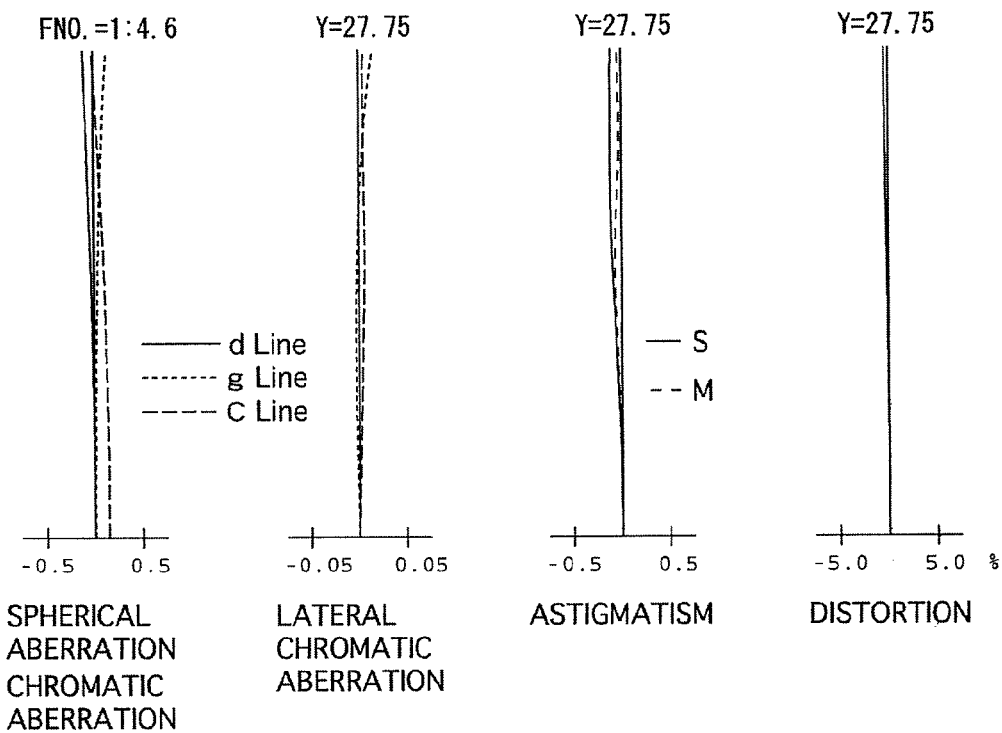
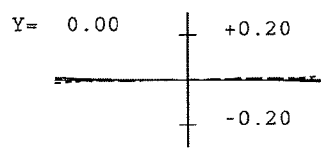
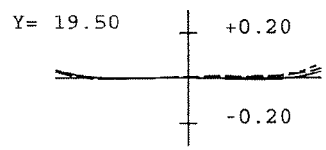
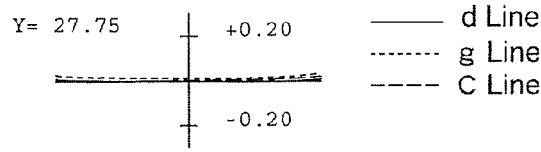

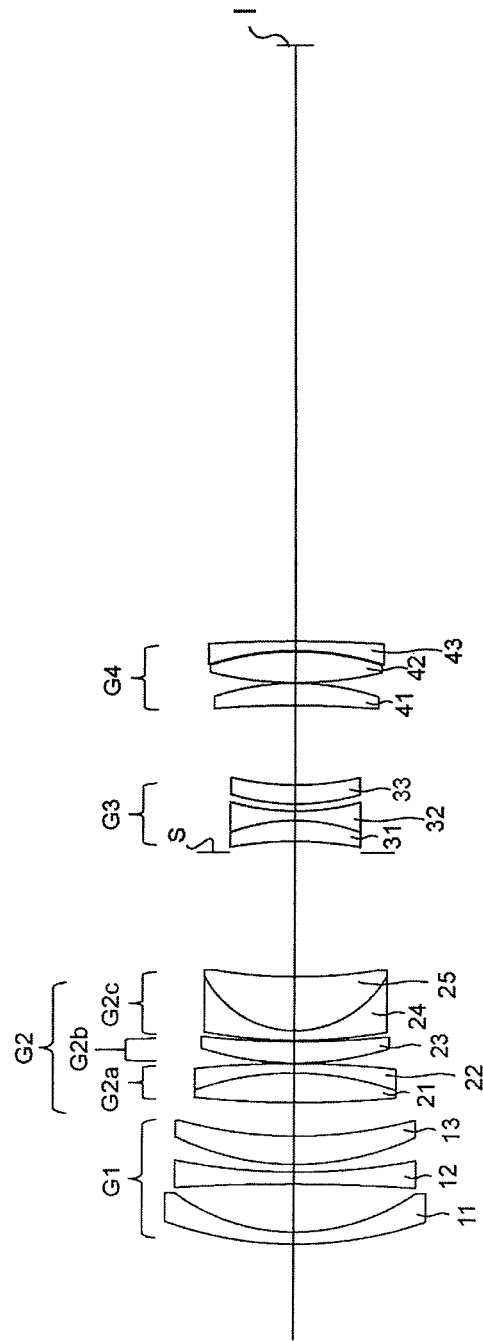

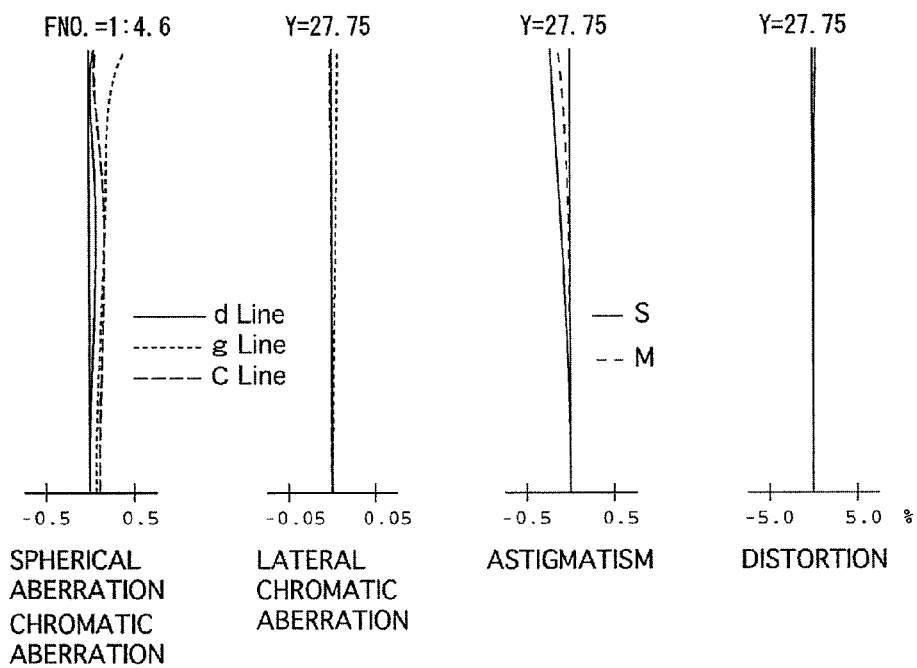
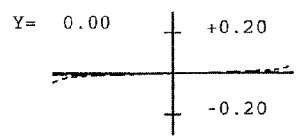
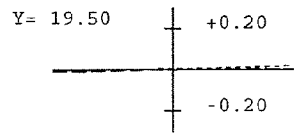
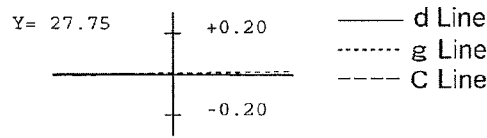

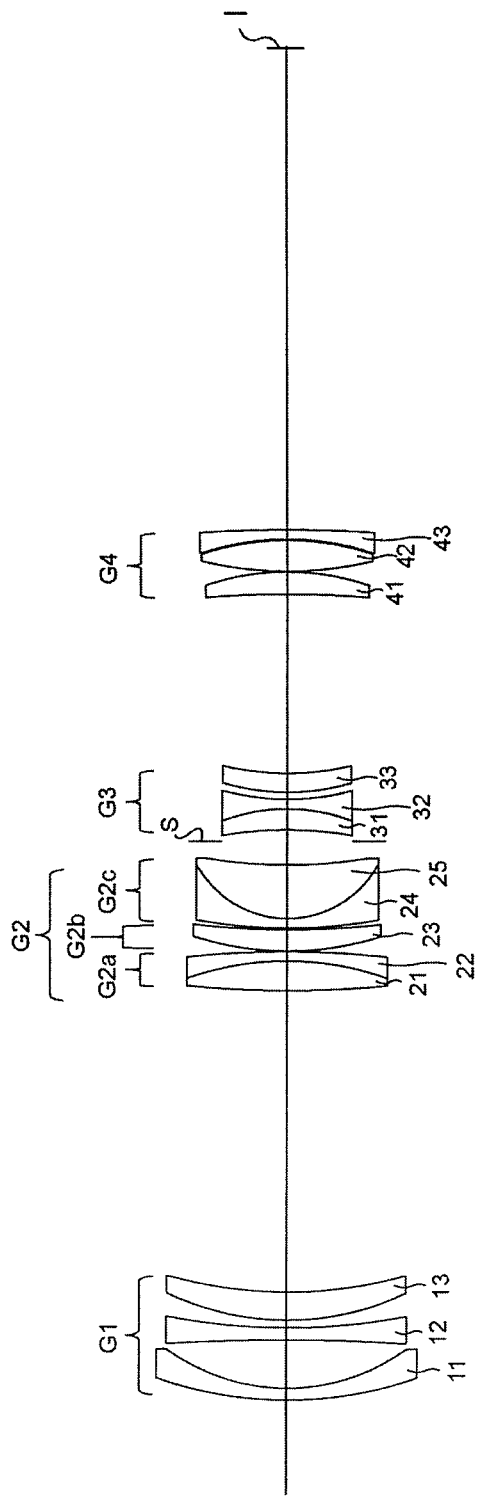

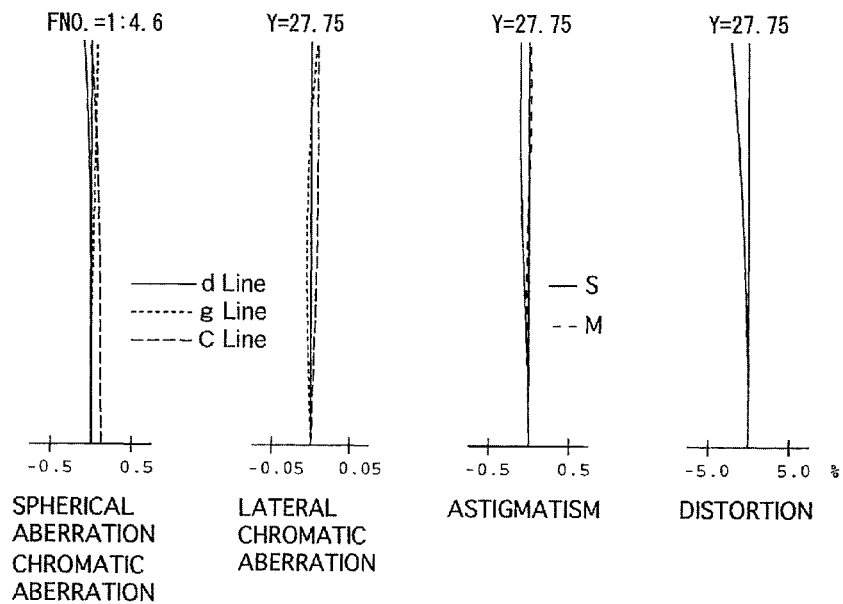
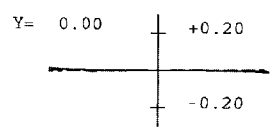
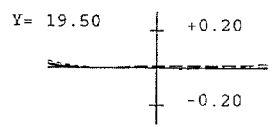
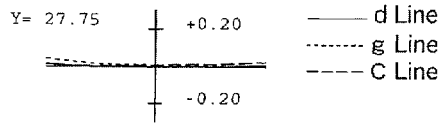

SPHERICAL ABERRATION CHROMATIC ABERRATION

LATERAL CHROMATIC ABERRATION

ASTIGMATISM

DISTORTION

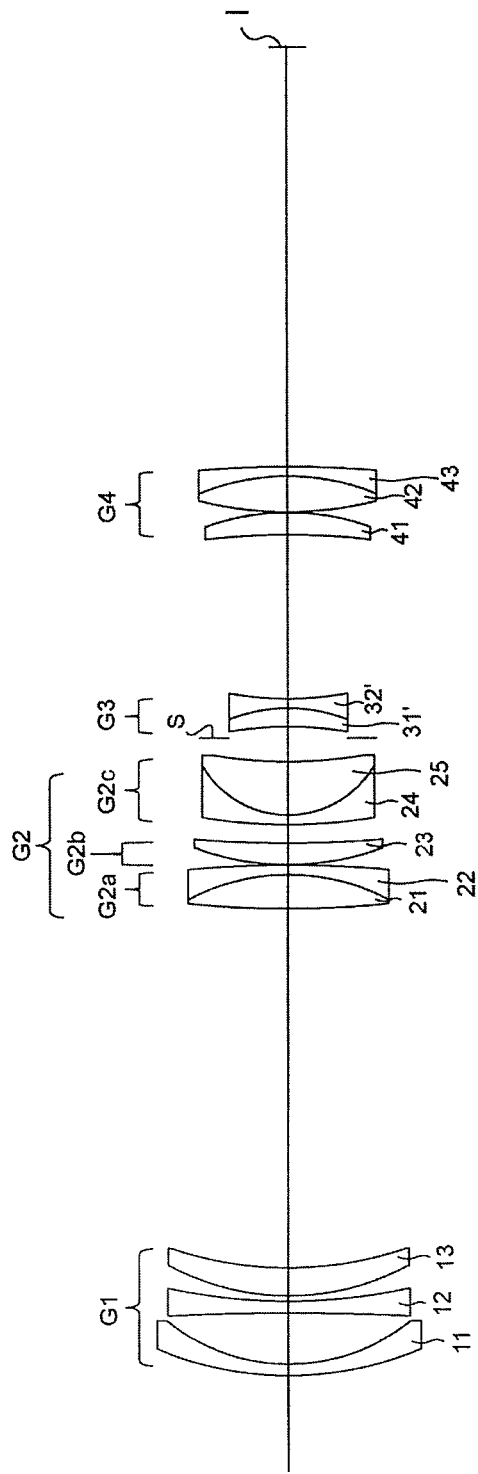

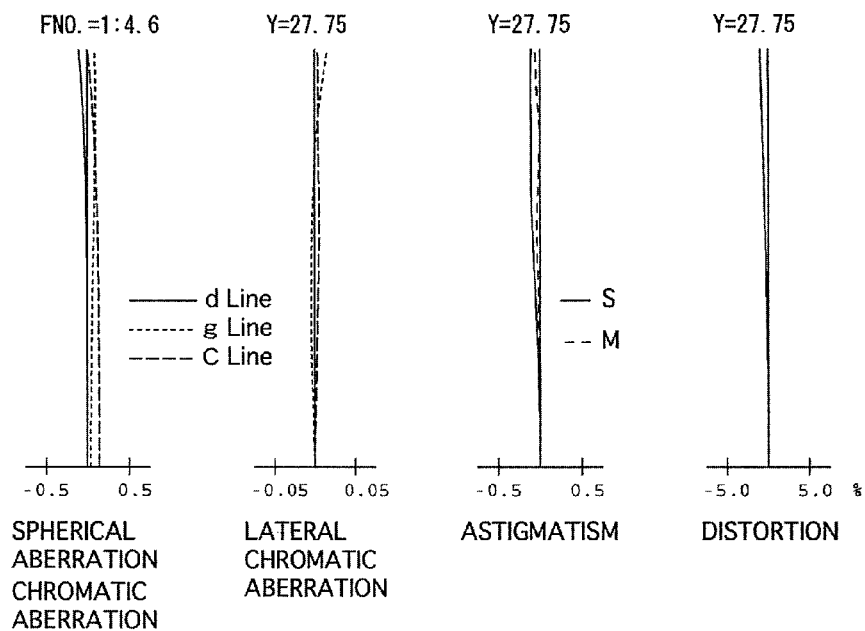
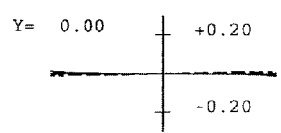
Fig. 18A
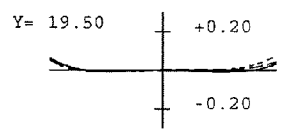
Fig. 18B
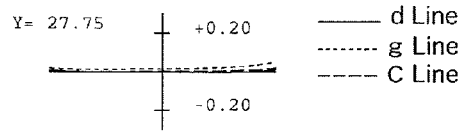
Fig. 18C

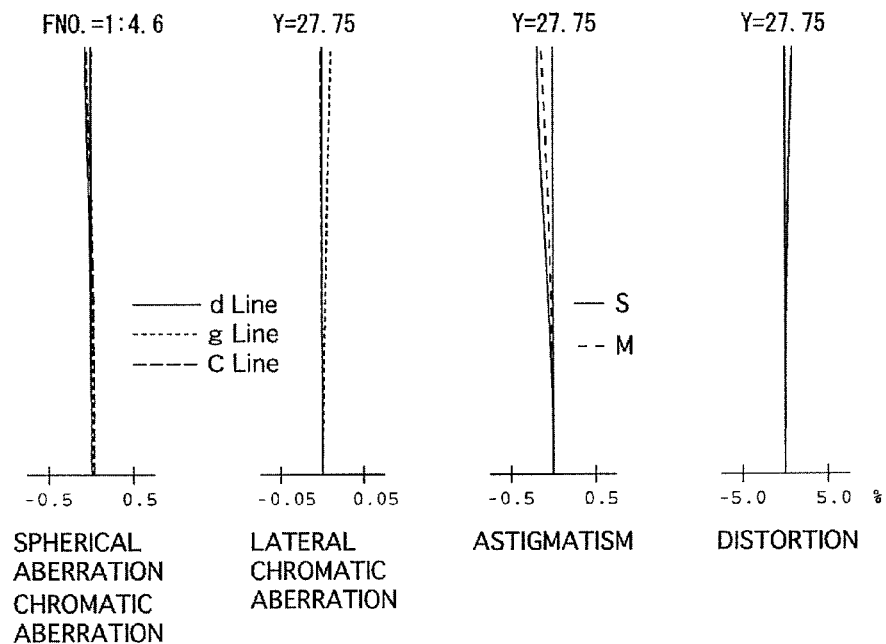
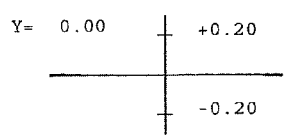
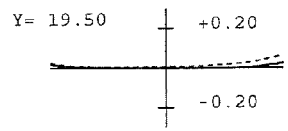
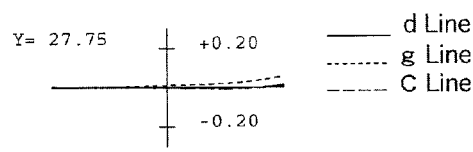

SPHERICAL ABERRATION CHROMATIC ABERRATION    LATERAL CHROMATIC ABERRATION    ASTIGMATISM    DISTORTION

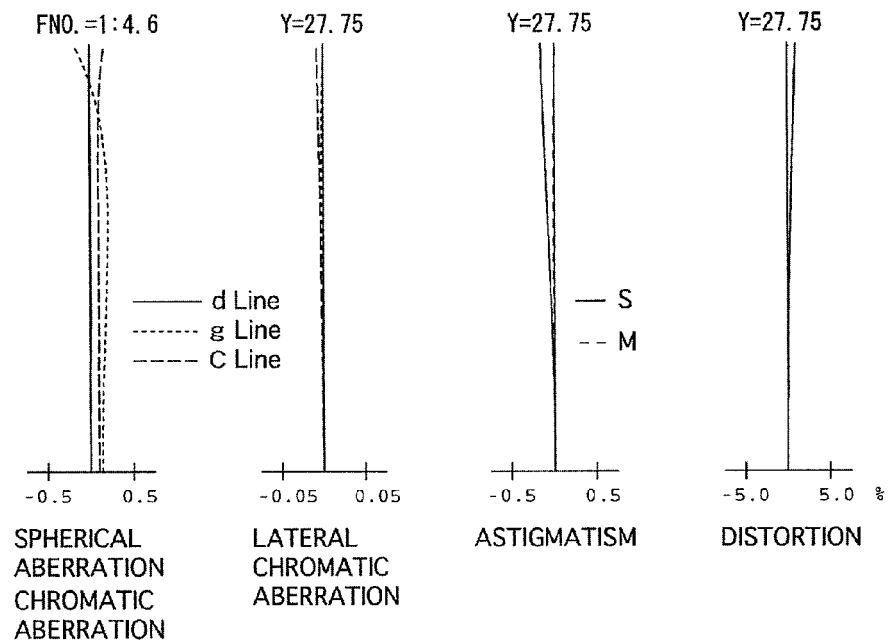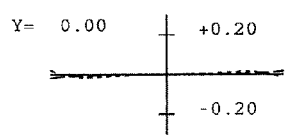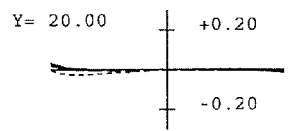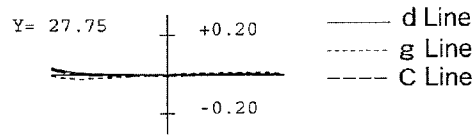

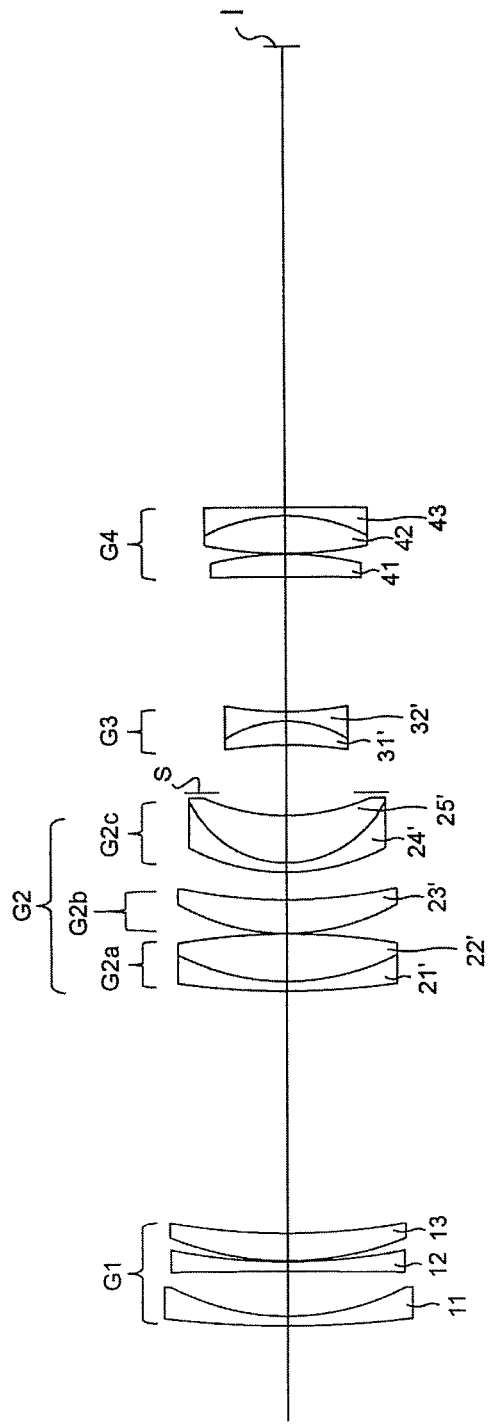

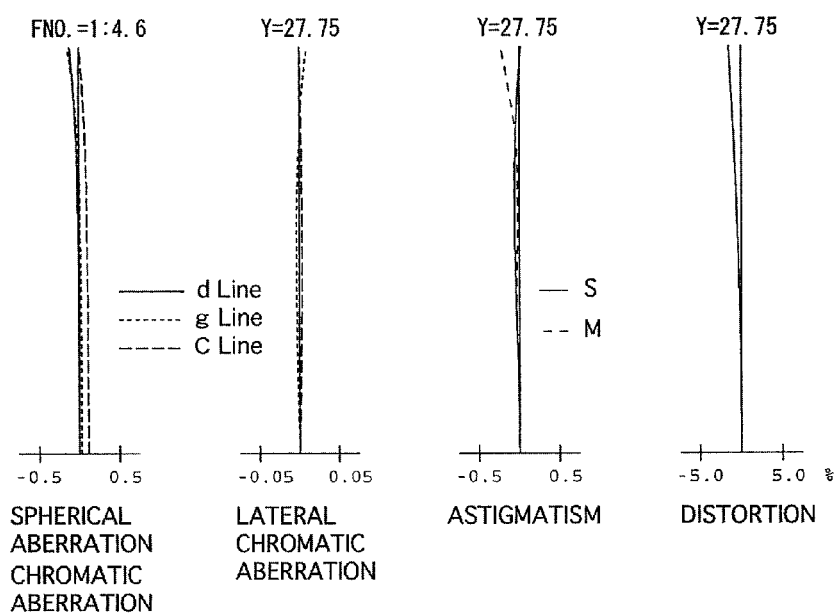
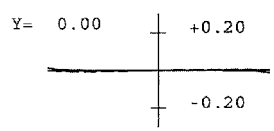
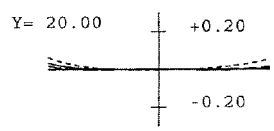
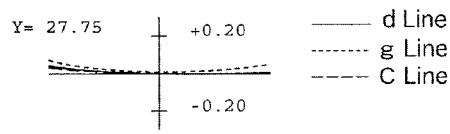

ZOOM LENS SYSTEM

BACKGROUND OF THE INVENTION

1. Field of the Invention

The present invention relates to a zoom lens system which includes a standard focal-length range to a intermediate telephoto range.

2. Description of Related Art

Zoom lens systems which includes a standard focal-length range to a intermediate telephoto range and which is configured of four lens groups, i.e., a configuration of a positive lens group, a negative lens group, a positive lens group and a positive lens group, in that order from the object side, or a configuration of a negative lens group, a positive lens group, a negative lens group and a positive lens group, in that order from the object side, are known in the art.

In the zoom lens system configuration of a positive lens group, a negative lens group, a positive lens group and a positive lens group, in that order from the object side, it is predominant for such a zoom lens system to have a function for correcting hand-shake (image-stabilizing function) by decentering a predetermined lens group (image-stabilizing lens group). In such a zoom lens system configuration, although there are advantages of being able to miniaturize the image-stabilizing lens group and being able to increase the zoom ratio, there is a disadvantage of deterioration in optical performance occurring during manufacture due to the error sensitivity thereof being high.

Whereas, in the zoom lens system configuration of a negative lens group, a positive lens group, a negative lens group and a positive lens group, in that order from the object side, although there is the advantage of the optical performance, at the design stage, not easily deteriorating during manufacture due to the error sensitivity being low, there is the disadvantage of it being difficult to improve the optical performance at the design stage if the zoom lens system is further miniaturized (and reduced in weight) in order to achieve a high zoom-ratio and/or provide an image-stabilizing function. Accordingly, there are very few zoom lens systems which employ a configuration of a negative lens group, a positive lens group, a negative lens group and a positive lens group, in that order from the object side, while providing an image-stabilizing function.

Japanese Unexamined Patent Publication Nos. 2010-217535 and 2009-14761 both disclose a zoom lens system having a negative lens group, a positive lens group, a negative lens group and a positive lens group, in that order from the object side, which is provided with an image-stabilizing function and in which the third lens group, which has the smallest diameter out of all four lens groups, is utilized as an image-stabilizing lens group. The third lens group that constitutes as an image-stabilizing lens group includes a cemented lens that is provided with a positive lens element and a negative lens element.

However, in the zoom lens system of each of the above-mentioned Japanese Unexamined Patent Publication Nos. 2010-217535 and 2009-14761, since the negative refractive power of the first lens group is too strong compared to the positive refractive power of the second lens group (since the balance of refractive power between the first lens group and the second lens group is inappropriate), resulting in the diameter of the light bundle that is incident on the lens groups that are provided rearwardly from the first lens group (i.e., the second lens group, the third lens group and the fourth lens group) becoming too large, a large amount of coma occurs, thereby deteriorating the optical quality. Furthermore, since the refractive power of the bonding surface between the positive lens element and the negative lens element of the cemented lens that is provided within the third lens group (the image-stabilizing lens group) is inappropriate, high-order aberrations that occur in the third lens group cannot be sufficiently cancelled out, so that the change in optical performance during an image-stabilizing operation increases, thereby deteriorating the optical performance.

Japanese Unexamined Patent Publication No. 2008-216881 discloses a zoom lens system which is not provided with an image-stabilizing function and is configured of a negative lens group, a positive lens group, a negative lens group and a positive lens group, in that order from the object side; however, even if this zoom lens system were to use the third lens group thereof as an image-stabilizing lens group, and the same problems as those in the zoom lens systems of the above-mentioned Japanese Unexamined Patent Publication Nos. 2010-217535 and 2009-14761 would occur.

SUMMARY OF THE INVENTION

The present invention has been devised with consideration to the above problems, and provides a zoom lens system including a negative lens group, a positive lens group, a negative lens group and a positive lens group, in that order from the object side, which utilizes the advantage of the optical performance not easily deteriorating during manufacture due to the error sensitivity being low, while achieving a superior optical performance when an image-stabilizing function is provided.

According to an aspect of the present invention, a zoom lens system is provided, including a negative first lens group, a positive second lens group, a negative third lens group, and a positive fourth lens group, in that order from the object side, wherein upon zooming from the short focal length extremity to the long focal length extremity, the distance between the first lens group and the second lens group decreases, the distance between the second lens group and the third lens group increases, and the distance between the third lens group and the fourth lens group decreases. The third lens group includes a cemented lens provided with a positive lens element and a negative lens element. The following conditions (1) and (2) are satisfied:

$$-2.50 < f1/f2 < -1.57 \qquad (1),$$

and $$f3/f3B < -0.1 \qquad (2),$$

wherein f1 designates the focal length of the first lens group, f2 designates the focal length of the second lens group, f3 designates the focal length of the third lens group, and f3B designates the focal length of a bonding surface in the cemented lens of the third lens group.

It is desirable for the zoom lens system of the present invention to satisfy the following condition (1') from within the range of condition (1):

$$-2.20 < f1/f2 < -1.57 \qquad (1').$$

It is desirable for the zoom lens system of the present invention to satisfy the following condition (2') from within the range of condition (2):

$$-0.7 < f3/f3B < -0.1 \qquad (2').$$

It is desirable for the following condition (3) to be satisfied:

$$0.9 < f12t/f4 < 3.0 \qquad (3),$$

wherein f12t designates the combined focal length of the first lens group and the second lens group at the long focal length extremity, and f4 designates the focal length of the fourth lens group.

It is desirable for the zoom lens system of the present invention to satisfy the following condition (3') from within the range of condition (3):

$$0.9 < f12t/f4 < 2.0 \quad (3'),$$

It is desirable for the following conditions (4), (5), (6) and (7) to be satisfied:

$$Ndp3 > 1.8 \quad (4),$$

$$vdp3 < 45 \quad (5),$$

$$Ndn3 < 1.75 \quad (6),$$

and $$vdn3 > 50 \quad (7),$$

wherein Ndp3 designates the refractive index at the d-line of the positive lens element of the cemented lens of the third lens group, vdp3 designates the Abbe number with respect to the d-line of the positive lens element of the cemented lens of the third lens group, Ndn3 designates the refractive index at the d-line of the negative lens element of the cemented lens of the third lens group, and vdn3 designates the Abbe number with respect to the d-line of the negative lens element of the cemented lens of the third lens group.

In another embodiment of the present invention, a zoom lens system is provided, including a negative first lens group, a positive second lens group, a negative third lens group, and a positive fourth lens group, in that order from the object side, wherein upon zooming from the short focal length extremity to the long focal length extremity, the distance between the first lens group and the second lens group decreases, the distance between the second lens group and the third lens group increases, and the distance between the third lens group and the fourth lens group decreases. The following conditions (1) and (3) are satisfied:

$$-2.50 < f1/f2 < -1.57 \quad (1),$$

and $$0.9 < f12t/f4 < 3.0 \quad (3),$$

wherein f1 designates the focal length of the first lens group, f2 designates the focal length of the second lens group, f12t designates the combined focal length of the first lens group and the second lens group at the long focal length extremity, and f4 designates the focal length of the fourth lens group.

A cemented lens, which is provided with a negative meniscus lens element having a convex surface on the object side and a positive meniscus lens element having a convex surface on the object side, in that order from the object side, can be provided closest to the image side within the second lens group.

In such a configuration, it is desirable for the following conditions (8) and (9) to be satisfied:

$$Ndn2 > Ndp2 \quad (8),$$

and $$vdp2 > 80 \quad (9),$$

wherein Ndn2 designates the refractive index at the d-line of the negative meniscus lens element of the cemented lens provided in the second lens group, Ndp2 designates the refractive index at the d-line of the positive meniscus lens element of the cemented lens provided in the second lens group, and vdp2 designates the Abbe number with respect to the d-line of the positive meniscus lens element of the cemented lens provided in the second lens group.

In another embodiment, a zoom lens system is provided, including a negative first lens group, a positive second lens group, a negative third lens group, and a positive fourth lens group, in that order from the object side, wherein upon zooming from the short focal length extremity to the long focal length extremity, the distance between the first lens group and the second lens group decreases, the distance between the second lens group and the third lens group increases, and the distance between the third lens group and the fourth lens group decreases. The second lens group includes a positive first sub-lens group, a positive second sub-lens group and a third sub-lens group, in that order from the object side, and the third sub-lens group includes a cemented lens, provided with a negative meniscus lens element having a convex surface on the object side and a positive meniscus lens element having a convex surface on the object side, in that order from the object side.

It is desirable for the following conditions (8) and (9) to be satisfied:

$$Ndn2 > Ndp2 \quad (8),$$

and $$vdp2 > 80 \quad (9),$$

wherein Ndn2 designates the refractive index at the d-line of the negative meniscus lens element of the cemented lens provided in the third sub-lens group of the second lens group, Ndp2 designates the refractive index at the d-line of the positive meniscus lens element of the cemented lens provided in the third sub-lens group of the second lens group, and vdp2 designates the Abbe number with respect to the d-line of the positive meniscus lens element of the cemented lens provided in the third sub-lens group of the second lens group.

It is desirable for the following condition (10) to be satisfied:

$$1.2 < f1/f3 < 2.5 \quad (10),$$

wherein f1 designates the focal length of the first lens group, and f3 designates the focal length of the third lens group.

In the present invention, the third lens group can remain stationary in the optical axis direction with respect to the imaging plane during zooming from the short focal length extremity to the long focal length extremity.

The fourth lens group can include a positive lens element having a convex surface on the image side, a positive lens element having a convex surface on the image side, and a negative lens element having a concave surface on the object side, in that order from the object side.

It is desirable for the following condition (11) to be satisfied:

$$vdp4 > 80 \quad (11),$$

wherein vdp4 designates the Abbe number with respect to the d-line of the positive lens element provided with a convex surface on the image side that is provided closest to the object side within the fourth lens group.

According to the present invention, a zoom lens system including a negative lens group, a positive lens group, a negative lens group and a positive lens group, in that order from the object side, is achieved, which utilizes the advantage of the optical performance not easily deteriorating during manufacture due to the error sensitivity being low, while achieving a superior optical performance when an image-stabilizing function is provided.

The present disclosure relates to subject matter contained in Japanese Patent Application No. 2012-282238 (filed on Dec. 26, 2012) which is expressly incorporated herein in its entirety.

BRIEF DESCRIPTION OF THE DRAWINGS

The present invention will be discussed below in detail with reference to the accompanying drawings, in which:

FIG. 1 shows a lens arrangement of a first numerical embodiment of a zoom lens system, according to the present invention, at the long focal length extremity when focused on an object at infinity;

FIGS. 2A, 2B, 2C and 2D show various aberrations that occurred in the lens arrangement shown in FIG. 1;

FIGS. 3A, 3B and 3C show various lateral aberrations that occurred in the lens arrangement shown in FIG. 1;

FIG. 4 shows a lens arrangement of the first numerical embodiment of the zoom lens system, according to the present invention, at the short focal length extremity when focused on an object at infinity;

FIGS. 5A, 5B, 5C and 5D show various aberrations that occurred in the lens arrangement shown in FIG. 4;

FIGS. 6A, 6B and 6C show various lateral aberrations that occurred in the lens arrangement shown in FIG. 4;

FIG. 7 shows a lens arrangement of a second numerical embodiment of a zoom lens system, according to the present invention, at the long focal length extremity when focused on an object at infinity;

FIGS. 8A, 8B, 8C and 8D show various aberrations that occurred in the lens arrangement shown in FIG. 7;

FIGS. 9A, 9B and 9C show various lateral aberrations that occurred in the lens arrangement shown in FIG. 7;

FIG. 10 shows a lens arrangement of the second numerical embodiment of the zoom lens system, according to the present invention, at the short focal length extremity when focused on an object at infinity;

FIGS. 11A, 11B, 11C and 11D show various aberrations that occurred in the lens arrangement shown in FIG. 10;

FIGS. 12A, 12B and 12C show various lateral aberrations that occurred in the lens arrangement shown in FIG. 10;

FIG. 16 shows a lens arrangement of the third numerical embodiment of the zoom lens system, according to the present invention, at the short focal length extremity when focused on an object at infinity;

FIGS. 17A, 17B, 17C and 17D show various aberrations that occurred in the lens arrangement shown in FIG. 16;

FIGS. 18A, 18B and 18C show various lateral aberrations that occurred in the lens arrangement shown in FIG. 16;

FIGS. 20A, 20B, 20C and 20D show various aberrations that occurred in the lens arrangement shown in FIG. 19;

FIGS. 21A, 21B and 21C show various lateral aberrations that occurred in the lens arrangement shown in FIG. 19;

FIGS. 26A, 26B, 26C and 26D show various aberrations that occurred in the lens arrangement shown in FIG. 25;

FIGS. 27A, 27B and 27C show various lateral aberrations that occurred in the lens arrangement shown in FIG. 25;

FIG. 28 shows a lens arrangement of the fifth numerical embodiment of the zoom lens system, according to the present invention, at the short focal length extremity when focused on an object at infinity;

FIGS. 29A, 29B, 29C and 29D show various aberrations that occurred in the lens arrangement shown in FIG. 28;

FIGS. 30A, 30B and 30C show various lateral aberrations that occurred in the lens arrangement shown in FIG. 28;

DESCRIPTION OF THE EMBODIMENTS

Figure 37:
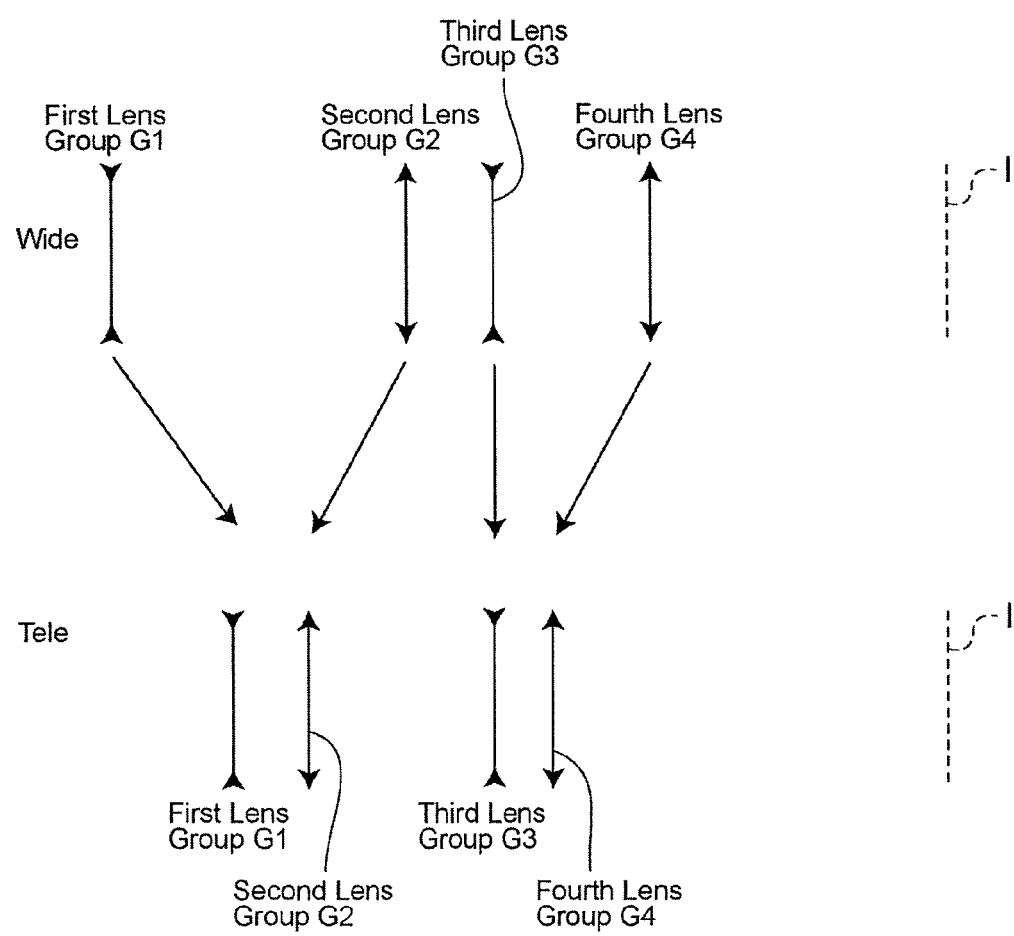
FIG. 37 shows a zoom path of the zoom lens system according to the present invention.

The zoom lens system of the first through sixth numerical embodiments according to the present invention, as shown in the zoom path of FIG. 37, is configured of a negative first lens group G1, a positive second lens group G2, a negative third lens group G3, and a positive fourth lens group G4, in that order from the object side. 'I' designates the imaging plane (image sensor).

In the zoom lens system of the first through sixth numerical embodiments, upon zooming from the short focal length extremity (Wide) to the long focal length extremity (Tele), the distance between the first lens group G1 and the second lens group G2 decreases, the distance between the second lens group G2 and the third lens group G3 increases, and the distance between the third lens group G3 and the fourth lens group G4 decreases.

More specifically, upon zooming from the short focal length extremity to the long focal length extremity, the first lens group G1 monotonically moves toward the image side, the second lens group G2 and the fourth lens group G4 become integral with each other and monotonically move toward the object side, and the third lens group G3 remains stationary (does not move in the optical axis direction) relative to the imaging plane I.

In each of the first through sixth numerical embodiments, the first lens group G1 is configured of a negative lens element 11, a negative lens element 12 and a positive lens element 13, in that order from the object side.

In each of the first through fourth numerical embodiments, the second lens group G2 is configured of a cemented lens provided with a positive lens element 21 and a negative lens element 22; a positive lens element 23; and a cemented lens provided with a negative lens element (a negative meniscus lens element having a convex surface on the object side) 24 and a positive lens element (a positive meniscus lens element having a convex surface on the object side) 25, in that order from the object side. The cemented lens provided with the positive lens element 21 and the negative lens element 22 constitutes a positive powered first sub-lens group G2a, the positive lens element 23 constitutes a positive powered second sub-lens group G2b, and the cemented lens provided with the negative lens element 24 and the positive lens element 25 constitutes a third sub-lens group G2c.

In the fifth and sixth numerical embodiments, the second lens group G2 is configured of a cemented lens provided with a negative lens element 21' and a positive lens element 22'; a positive lens element 23'; and a cemented lens provided with a negative lens element (a negative meniscus lens element having a convex surface on the object side) 24' and a positive lens element (a positive meniscus lens element having a convex surface on the object side) 25', in that order from the object side. The cemented lens provided with the negative lens element 21' and the positive lens element 22' constitutes a positive powered first sub-lens group G2a, the positive lens element 23' constitutes a positive powered second sub-lens group G2b, and the cemented lens provided with the negative lens element 24' and the positive lens element 25' constitutes a third sub-lens group G2c.

In the first and second numerical embodiments, the third lens group G3 is configured of a cemented lens provided with a positive lens element 31 and a negative lens element 32; and a positive lens element 33, in that order from the object side.

In the third and fifth numerical embodiments, the third lens group G3 is configured of a cemented lens provided with a positive lens element 31' and a negative lens element 32', in that order from the object side.

In the fourth and sixth numerical embodiments, the third lens group G3 is configured of a cemented lens provided with a positive lens element 31" and a negative lens element 32"; and a negative lens element 33", in that order from the object side.

In each of the first through sixth numerical embodiments, the fourth lens group G4 is configured of a positive lens element (a positive lens element having a convex surface on the image side) 41, a positive lens element (a positive lens element having a convex surface on the image side) 42, and a negative lens element (a negative lens element having a concave surface on the object side) 43, in that order from the object side. In the first and second numerical embodiments, the positive lens element 42 and the negative lens element 43 are not bonded to each other (i.e., do not form a cemented lens), whereas in the third through sixth numerical embodiments, the positive lens element 42 and the negative lens element 43 are bonded to each other (i.e., form a cemented lens).

In the case where an image-stabilizing function is provided in the zoom lens system of the illustrated embodiments, it is desirable for the entire third lens group G3, which has the smallest diameter out of the first through fourth lens groups G1 through G4, to be used as an image-stabilizing lens group (image-blur correction lens group) which corrects image blur by displacing the imaging position by moving (decentering) the third lens group G3 in directions orthogonal to the optical axis. The following explanations are given on premise that the third lens group G3 constitutes the image-stabilizing lens group.

In the zoom lens system of the illustrated embodiments, due to the third lens group G3 (image-stabilizing lens group) remaining stationary relative to the imaging plane I during zooming from the short focal length extremity to the long focal length extremity, a high-precision image-stabilizing control becomes achievable. Furthermore, by miniaturizing and reducing the weight of the zoom driving mechanism, the space that is occupied by the zoom driving mechanism can be reduced, and in turn the miniaturization and the reduction in weight of the entire zoom lens system can be achieved. Additionally, the zoom driving mechanism and the image-stabilizing mechanism can be prevented from being mutually closely-arranged (closely installed), thereby improving space efficiency.

By providing the third lens group G3 as an image-stabilizing lens group that remains stationary with respect to the optical axis direction during zooming, the decentration sensitivity of the third lens group G3 can be suppressed, thereby resulting in the second lens group G2 and the fourth lens group G4, which are provided on either side of the third lens group G3, having a relatively reversed sensitivity. Therefore, by integrally moving the second lens group G2 and the fourth lens group G4 (which are provided on either side of the third lens group G3) during zooming from the short focal length extremity to the long focal length extremity, the error sensitivity of the entire zoom lens system, including the lens groups that are moved during zooming (i.e., the first, second and fourth lens groups G1, G2 and G4), can be reduced.

Furthermore, in the illustrated embodiments of the zoom lens system, by appropriately determining the refractive-power balance between the first lens group G1 and the second lens group G2, and also by appropriately determining the refractive-power balance between the third lens group (image-stabilizing lens group) G3 and the bonding surface of the cemented lens provided with a positive lens element and a negative lens element, in that order from the object side (31 and 32, 31' and 32', or 31" and 32"), within the third lens group G3, a superior optical performance can be achieved when the third lens group G3 is provided with an image-stabilizing function (when the third lens group G3 is provided as an image-stabilizing lens group).

Condition (1) specifies the ratio of the focal length of the first lens group G1 to the focal length of the second lens group G2. By satisfying condition (1), coma can be suppressed while reducing fluctuation in spherical aberrations during zooming, thereby achieving a superior optical performance.

If the upper limit of condition (1) is exceeded, the negative refractive power of the first lens group G1 becomes too strong, so that the diameter of the light bundle that is incident on the lens groups provided rearwardly from the first lens group G1 (i.e., the second lens group G2, the third lens group G3 and the fourth lens group G4) becomes too large, resulting in a large amount of coma occurring.

If the lower limit of condition (1) is exceeded, the positive refractive power of the second lens group G2 becomes too large, so that the fluctuation in the spherical aberration during zooming increases.

Condition (2) specifies the ratio of the focal length of the third lens group G3 to the focal length of the bonded surface of the cemented lens provided with the positive lens element and the negative lens element, in that order from the object side (31 and 32, 31' and 32', or 31" and 32"), that is provided in the third lens group G3. Condition (2) specifies a strong positive refractive power for the bonded surface of the cemented lens provided with the positive lens element and the negative lens element, in that order from the object side (31 and 32, 31' and 32', or 31" and 32"), that is provided in the third lens group G3. The third lens group G3 (image-stabilizing lens group) has an overall negative refractive power, and since the surface closest to the object side of the third lens group G3 and the surface closest to the image side of the third lens group G3 both have a negative refractive power, a negative aberration component occurs within the third lens group G3. Therefore, by providing a strong positive refractive power at the bonded surface of the cemented lens provided with the positive lens element and the negative lens element, in that order from the object side (31 and 32, 31' and 32', or 31" and 32"), that is provided in the third lens group G3, the negative aberration component that occurs in the third lens group G3 is cancelled, so that changes in the optical performance during an image-stabilizing operation can be reduced to a minimum. Furthermore, occurrence of high-order aberrations can be suppressed by avoiding cancellation of large aberrations in the third lens group G3.

If the upper limit of condition (2) is exceeded, the positive refractive power at the bonded surface of the cemented lens provided with the positive lens element and the negative lens element, in that order from the object side (31 and 32, 31' and 32', or 31" and 32"), that is provided in the third lens group G3, becomes too weak, or the refractive power at the bonded surface becomes negative, and accordingly, changes in the optical performance during an image-stabilizing operation (during decentering) increase, thereby deteriorating the optical performance.

Condition (3) specifies the ratio of the combined focal length of the first lens group G1 and the second lens group G2 at the long focal length extremity to the focal length of the fourth lens group G4. By satisfying condition (3), abaxial coma can be favorably corrected and occurrence of decentration coma during an image-stabilizing operation can be suppressed, so that a superior optical performance can be achieved.

If the upper limit of condition (3) is exceeded, the refractive power of the fourth lens group G4 becomes too strong, so that it becomes difficult to correct abaxial coma.

If the lower limit of condition (3) is exceeded, the combined refractive power of the first lens group G1 and the second lens group G2 becomes too strong, and since a strong-powered converging light bundle is incident on the third lens group G3 (image-stabilizing lens group), decentration coma easily occurs during an image-stabilizing operation.

Conditions (4), (5), (6) and (7) specify requirements for a glass material that is used to form the cemented lens that is provided in the third lens group G3.

By using a glass material having a refractive index that satisfies conditions (4) and (6) to form the positive lens element (31, 31' or 31") and the negative lens element (32, 32' or 32") which constitute the cemented lens that is provided in the third lens group G3, coma that occurs during an image-stabilizing operation can be favorably corrected so that a superior optical performance can be achieved.

By using a glass material having an Abbe number that satisfies conditions (5) and (7) to form the positive lens element (31, 31' or 31") and the negative lens element (32, 32' or 32"), which constitute the cemented lens that is provided in the third lens group G3, chromatic aberration can be favorably corrected so that a superior optical performance can be achieved.

As described above, in each of the first through sixth numerical embodiments, the second lens group G2 includes, closest to the image side therein, a cemented lens provided with a negative meniscus lens element having a convex surface on the object side and a positive meniscus lens element having a convex surface on the object side (a cemented lens provided with a negative lens element 24 and a positive lens element 25, or a cemented lens provided with a negative lens element 24' and a positive lens element 25'), in that order from the object side. A strong chromatic-aberration suppressing effect can be achieved by the bonded surface of this cemented lens.

On the premise that the second lens group G2 has the above-described configuration, condition (8) specifies the refractive index at the d-line of the negative meniscus lens element (negative lens element 24 or 24') of the cemented lens that is provided closest to the image side within the second lens group G2 to be larger than the refractive index at the d-line of the positive meniscus lens element (positive lens element 25 or 25') of the cemented lens that is provided closest to the image side within the second lens group G2.

Furthermore, on the premise that the second lens group G2 has the above-described configuration, condition (9) specifies the Abbe number with respect to the d-line of the positive meniscus lens element (positive lens element 25 or 25') of the cemented lens that is provided closest to the image side within the second lens group G2 to be 80 or more.

By using a specialized low-dispersion glass that satisfies condition (9) to form the positive meniscus lens element (positive lens element 25 or 25'), axial chromatic aberration can be corrected so that a superior optical performance can be achieved. On the other hand, specialized low-dispersion glass is disadvantageous for correcting spherical aberration due to specialized low-dispersion glass having a low refractive index. To solve this problem, as specified by condition (8), the refractive index at the d-line of the negative meniscus lens element (negative lens element 24 or 24') is made larger than the refractive index at the d-line of the positive meniscus lens element (positive lens element 25 or 25') so that occurrence of spherical aberration can be reduced.

In other words, by simultaneously satisfying conditions (8) and (9), axial chromatic aberration and spherical aberration can be favorably corrected, so that a superior optical performance can be obtained.

Condition (10) specifies the ratio of the focal length of the first lens group G1 to the focal length of the third lens group G3. By satisfying condition (10), occurrence of coma in particular during an image-stabilizing operation can be suppressed to thereby achieve a superior optical performance.

If the upper limit of condition (10) is exceeded, the refractive power of the third lens group G3 becomes too strong, so that fluctuations in coma during an image-stabilizing operation increase.

If the lower limit of condition (10) is exceeded, the refractive power of the first lens group G1 becomes too strong, so that due to the diameter of the light bundle that is incident on the lens groups that are provided behind the first lens group G1 (i.e., the second lens group G2, the third lens group G3 and the fourth lens group G4) becoming too large, large amounts of coma occur.

As described above, in each of the first through sixth numerical embodiments, the fourth lens group G4 is configured of a positive lens element (a positive lens element having a convex surface on the image side) 41, a positive lens element (a positive lens element having a convex surface on the image side) 42, and a negative lens element (a negative lens element having a concave surface on the object side) 43, in that order from the object side. According to this configuration, various aberrations such as abaxial coma and astigmatism can be favorably corrected.

On the premise that the fourth lens group G4 has the above-described configuration, condition (11) specifies the Abbe number with respect to the d-line of the positive lens element (a positive lens element provided with a convex surface on the image side) 41 that is provided closest to the object side within the fourth lens group G4. By using a specialized low-dispersion glass that satisfies condition (11) to form the positive lens element (positive lens element provided with a convex surface on the image side) 41, axial chromatic aberration and abaxial chromatic aberration can be favorably corrected in a balanced manner.

Specific numerical embodiments (first through sixth numerical embodiments) will be herein discussed. In the aberration diagrams, lateral aberration diagrams, and the tables, the d-line, g-line and C-line show aberrations at their respective wave-lengths; S designates the sagittal image, M designates the meridional image, Fno. designates the f-number, f designates the focal length of the entire optical system, W designates the half angle of view (°), Y designates the image height, fB designates the backfocus, L designates the overall length of the lens system, R designates the radius of curvature, d designates the lens thickness or distance between lenses, N(d) designates the refractive index at the d-line, and ν(d) designates the Abbe number with respect to the d-line. The values for the f-number, the focal length, the half angle-of-view, the image height, the backfocus, the overall length of the lens system, and the distance between lenses (which changes during zooming) are shown in the following order: short focal length extremity, intermediate focal length, and long focal length extremity. The unit used for the various lengths is defined in millimeters (mm). None of the first through sixth numerical embodiments utilize an aspherical surface.

Numerical Embodiment 1

FIGS. 1 through 6C and Tables 1 through 3 show a first numerical embodiment of a zoom lens system according to the present invention. FIG. 1 shows a lens arrangement of the first numerical embodiment of the zoom lens system at the long focal length extremity when focused on an object at infinity. FIGS. 2A, 2B, 2C and 2D show various aberrations that occurred in the lens arrangement shown in FIG. 1. FIGS. 3A, 3B and 3C show lateral aberrations that occurred in the lens arrangement shown in FIG. 1. FIG. 4 shows a lens arrangement of the first numerical embodiment of the zoom lens system at the short focal length extremity when focused on an object at infinity. FIGS. 5A, 5B, 5C and 5D show various aberrations that occurred in the lens arrangement shown in FIG. 4. FIGS. 6A, 6B and 6C show lateral aberrations that occurred in the lens arrangement shown in FIG. 4. Table 1 shows the lens surface data, Table 2 shows various data of the zoom lens system, and Table 3 shows various data of the lens groups.

The zoom lens system of the first numerical embodiment is configured of a negative first lens group G1, a positive second lens group G2, a negative third lens group G3, and a positive fourth lens group G4, in that order from the object side. The diaphragm S which is provided in between the second lens group G2 and the third lens group G3 remains stationary with respect to the imaging plane I during zooming and does not decenter during an image-stabilizing operation.

The first lens group G1 is configured of a negative meniscus lens element 11 having a convex surface on the object side, a biconcave negative lens element 12, and a positive meniscus lens element 13 having a convex surface on the object side, in that order from the object side.

The second lens group G2 is configured of a positive meniscus lens element 21 having a convex surface on the image side, a negative meniscus lens element 22 having a convex surface on the image side, a positive meniscus lens element 23 having a convex surface on the object side, a negative meniscus lens element 24 having a convex surface on the object side, and a positive meniscus lens element 25 having a convex surface on the object side, in that order from the object side. The surface on the image side of the positive meniscus lens element 21 and the surface on the object side of the negative meniscus lens element 22 are bonded together. The surface on the image side of the negative meniscus lens element 24 and the surface on the object side of the positive meniscus lens element 25 are bonded together. The positive meniscus lens element 21 and the negative meniscus lens element 22 constitute a positive first sub-lens group G2a, the positive meniscus lens element 23 constitutes a second sub-lens group G2b, and the negative meniscus lens element 24 and the positive meniscus lens element 25 constitute a third sub-lens group G2c.

The third lens group G3 is configured of a cemented lens provided with a positive meniscus lens element 31 having a convex surface on the image side and a biconcave negative lens element 32; and a positive meniscus lens element 33 having a convex surface on the object side, in that order from the object side.

The fourth lens group G4 is configured of a positive meniscus lens element 41 having a convex surface on the image side, a biconvex positive lens element 42, and a negative meniscus lens element 43 having a convex surface on the image side, in that order from the object side.

TABLE 1

SURFACE DATA

| Surf. No. | R | d | N(d) | ν (d) |
|---|---|---|---|---|
| 1 | 97.459 | 2.50 | 1.72916 | 54.7 |
| 2 | 45.551 | 9.77 | | |
| 3 | −397.295 | 2.50 | 1.62041 | 60.3 |
| 4 | 183.591 | 1.00 | | |
| 5 | 59.958 | 5.88 | 1.80518 | 25.4 |
| 6 | 93.562 | d6 | | |
| 7 | −1631.149 | 6.00 | 1.80420 | 46.5 |
| 8 | −53.043 | 2.00 | 1.80518 | 25.5 |
| 9 | −126.748 | 0.10 | | |
| 10 | 67.633 | 4.10 | 1.72916 | 54.7 |
| 11 | 218.797 | 3.04 | | |
| 12 | 70.331 | 2.00 | 1.51742 | 52.4 |
| 13 | 21.848 | 11.30 | 1.49700 | 81.6 |
| 14 | 74.206 | d14 | | |
| 15(Diaphragm) | ∞ | 2.40 | | |
| 16 | −91.789 | 4.40 | 1.80610 | 40.9 |
| 17 | −41.761 | 2.00 | 1.60311 | 60.7 |
| 18 | 58.975 | 1.50 | | |
| 19 | 58.201 | 4.00 | 1.69895 | 30.1 |
| 20 | 85.851 | d20 | | |
| 21 | −103.960 | 4.70 | 1.49700 | 81.6 |
| 22 | −50.226 | 0.10 | | |
| 23 | 103.369 | 6.00 | 1.48749 | 70.4 |
| 24 | −65.913 | 0.80 | | |
| 25 | −54.240 | 2.00 | 1.80440 | 39.6 |
| 26 | −154.466 | — | | |

TABLE 2

ZOOM LENS SYSTEM DATA
Zoom Ratio: 1.89

| | Short Focal Length Extremity | Intermediate Focal Length | Long Focal Length Extremity |
|---|---|---|---|
| FNO. | 4.6 | 4.6 | 4.6 |
| f | 82.40 | 105.00 | 156.00 |
| W | 18.7 | 14.7 | 10.0 |
| Y | 27.75 | 27.75 | 27.75 |
| fB | 86.58 | 93.56 | 108.84 |
| L | 283.16 | 258.86 | 238.44 |
| d6 | 74.07 | 42.79 | 7.08 |
| d14 | 5.00 | 11.98 | 27.26 |
| d20 | 39.42 | 32.45 | 17.16 |

TABLE 3

LENS GROUP DATA

| Lens Group | 1st Surf. | Focal Length |
|---|---|---|
| 1 | 1 | −119.61 |
| 2 | 7 | 69.55 |
| 3 | 16 | −97.16 |
| 4 | 21 | 125.09 |

Numerical Embodiment 2

FIGS. 7 through 12C and Tables 4 through 6 show a second numerical embodiment of a zoom lens system according to the present invention. FIG. 7 shows a lens arrangement of the second numerical embodiment of the zoom lens system at the long focal length extremity when focused on an object at infinity. FIGS. 8A, 8B, 8C and 8D show various aberrations that occurred in the lens arrangement shown in FIG. 7. FIGS. 9A, 9B and 9C show lateral aberrations that occurred in the lens arrangement shown in FIG. 7. FIG. 10 shows a lens arrangement of the second numerical embodiment of the zoom lens system at the short focal length extremity when focused on an object at infinity. FIGS. 11A, 11B, 11C and 11D show various aberrations that occurred in the lens arrangement shown in FIG. 10. FIGS. 12A, 12B and 12C show lateral aberrations that occurred in the lens arrangement shown in FIG. 10. Table 4 shows the lens surface data, Table 5 shows various data of the zoom lens system, and Table 6 shows various data of the lens groups.

The lens arrangement of the second numerical embodiment is the same as that of the first numerical embodiment except for the following configuration:

(1) The positive lens element 21 of the second lens group G2 is a biconvex positive lens element.

TABLE 4

SURFACE DATA

| Surf. No. | R | d | N(d) | ν (d) |
|---|---|---|---|---|
| 1 | 85.753 | 2.50 | 1.72916 | 54.7 |
| 2 | 45.010 | 10.00 | | |
| 3 | −405.844 | 2.50 | 1.62041 | 60.3 |
| 4 | 138.488 | 1.59 | | |
| 5 | 60.732 | 5.88 | 1.80518 | 25.4 |
| 6 | 96.533 | d6 | | |
| 7 | 229.041 | 6.20 | 1.80400 | 46.6 |
| 8 | −65.056 | 2.00 | 1.80518 | 25.5 |
| 9 | −200.941 | 0.10 | | |
| 10 | 67.270 | 4.50 | 1.72916 | 54.7 |
| 11 | 184.148 | 0.32 | | |
| 12 | 111.019 | 2.00 | 1.51742 | 52.4 |
| 13 | 22.407 | 11.30 | 1.49700 | 81.6 |
| 14 | 108.055 | d14 | | |
| 15(Diaphragm) | ∞ | 2.40 | | |
| 16 | −81.228 | 4.40 | 1.80440 | 39.6 |
| 17 | −39.629 | 2.00 | 1.60311 | 60.7 |
| 18 | 52.451 | 1.50 | | |
| 19 | 49.000 | 4.00 | 1.78472 | 25.7 |
| 20 | 60.648 | d20 | | |
| 21 | −217.120 | 4.70 | 1.49700 | 81.6 |
| 22 | −54.830 | 0.10 | | |
| 23 | 78.887 | 6.56 | 1.48749 | 70.2 |
| 24 | −59.564 | 0.22 | | |
| 25 | −58.995 | 2.00 | 1.80440 | 39.6 |
| 26 | −298.804 | — | | |

TABLE 5

ZOOM LENS SYSTEM DATA
Zoom Ratio: 1.89

| | Short Focal Length Extremity | Intermediate Focal Length | Long Focal Length Extremity |
|---|---|---|---|
| FNO. | 4.6 | 4.6 | 4.6 |
| f | 82.40 | 105.00 | 156.00 |
| W | 19.0 | 14.9 | 10.1 |
| Y | 27.75 | 27.75 | 27.75 |
| fB | 101.71 | 108.46 | 122.71 |
| L | 284.37 | 264.54 | 249.31 |
| d6 | 63.11 | 36.52 | 7.05 |
| d14 | 4.98 | 11.73 | 25.98 |
| d20 | 37.80 | 31.04 | 16.80 |

TABLE 6

LENS GROUP DATA

| Lens Group | 1st Surf. | Focal Length |
|---|---|---|
| 1 | 1 | −117.29 |
| 2 | 7 | 69.67 |
| 3 | 16 | −75.24 |
| 4 | 21 | 95.52 |

Numerical Embodiment 3

Figure 13:
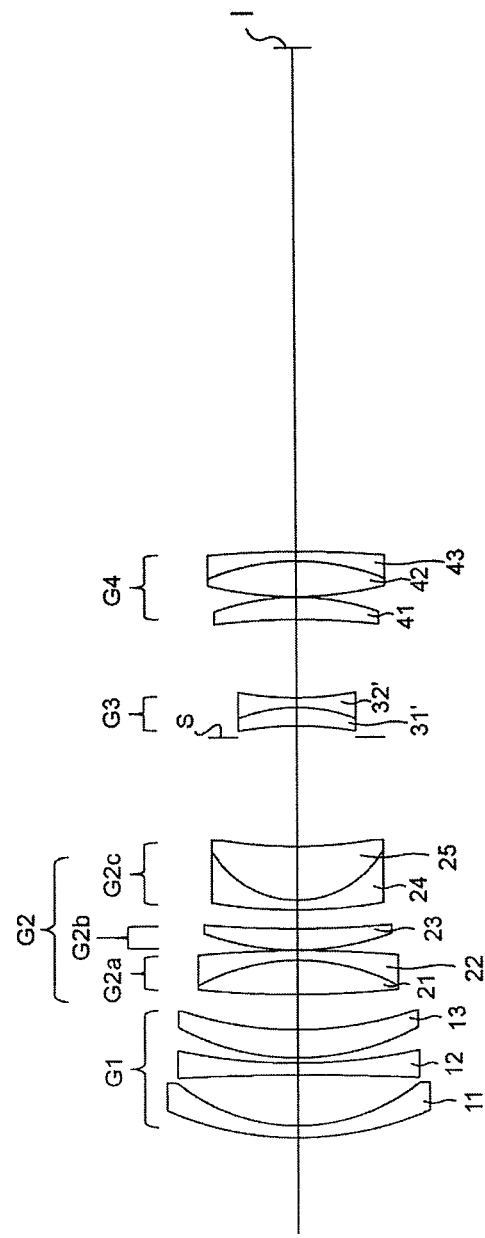
FIG. 13 shows a lens arrangement of a third numerical embodiment of a zoom lens system, according to the present invention, at the long focal length extremity when focused on an object at infinity.
Figures 14A, 14B, 14C, 14D, 15A, 15B, 15C:
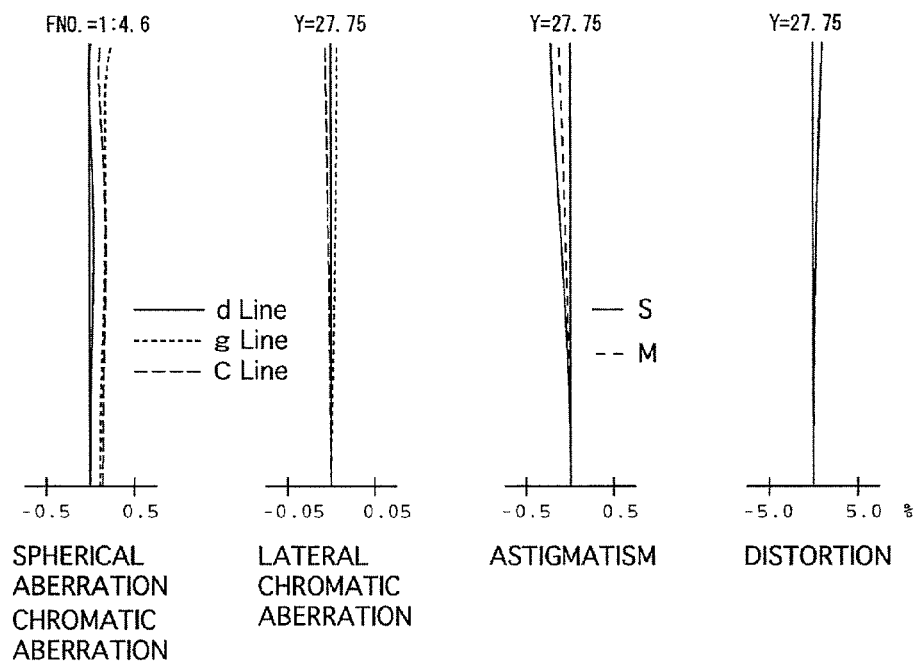
FIGS. 14A, 14B, 14C and 14D show various aberrations that occurred in the lens arrangement shown in FIG. 13.
FIGS. 15A, 15B and 15C show various lateral aberrations that occurred in the lens arrangement shown in FIG. 13.

FIGS. 13 through 18C and Tables 7 through 9 show a third numerical embodiment of a zoom lens system according to the present invention. FIG. 13 shows a lens arrangement of the third numerical embodiment of the zoom lens system at the long focal length extremity when focused on an object at infinity. FIGS. 14A, 14B, 14C and 14D show various aberrations that occurred in the lens arrangement shown in FIG. 13. FIGS. 15A, 15B and 15C show lateral aberrations that occurred in the lens arrangement shown in FIG. 13. FIG. 16 shows a lens arrangement of the third numerical embodiment of the zoom lens system at the short focal length extremity when focused on an object at infinity. FIGS. 17A, 17B, 17C and 17D show various aberrations that occurred in the lens arrangement shown in FIG. 16. FIGS. 18A, 18B and 18C show lateral aberrations that occurred in the lens arrangement shown in FIG. 16. Table 7 shows the lens surface data, Table 8 shows various data of the zoom lens system, and Table 9 shows various data of the lens groups.

The lens arrangement of the third numerical embodiment is the same as that of the first numerical embodiment except for the following configurations:

(1) The positive lens element 21 of the second lens group G2 is a biconvex positive lens element.

(2) The third lens group G3 is a cemented lens provided with a positive meniscus lens element 31' having a convex surface on the image side, and a biconcave negative lens element 32', in that order from the object side.

(3) The biconvex positive lens element 42 and the negative meniscus lens element 43 of the fourth lens group G4 are bonded together to form a cemented lens.

TABLE 7

SURFACE DATA

| Surf. No. | R | d | N(d) | ν(d) |
|---|---|---|---|---|
| 1 | 72.454 | 2.50 | 1.69680 | 55.5 |
| 2 | 42.058 | 10.67 | | |
| 3 | −547.949 | 2.50 | 1.60311 | 60.7 |
| 4 | 124.689 | 1.13 | | |
| 5 | 54.858 | 5.88 | 1.80518 | 25.4 |
| 6 | 79.855 | d6 | | |
| 7 | 220.609 | 7.13 | 1.80440 | 39.6 |
| 8 | −46.370 | 2.00 | 1.80518 | 25.5 |
| 9 | −245.850 | 0.10 | | |
| 10 | 59.262 | 4.50 | 1.74400 | 44.9 |
| 11 | 246.738 | 3.93 | | |
| 12 | 114.143 | 2.00 | 1.54072 | 47.2 |
| 13 | 21.440 | 11.30 | 1.49700 | 81.6 |
| 14 | 99.781 | d14 | | |
| 15 (Diaphragm) | ∞ | 2.40 | | |
| 16 | −73.502 | 3.92 | 1.85026 | 32.3 |
| 17 | −34.368 | 2.00 | 1.62299 | 58.2 |
| 18 | 70.209 | d18 | | |
| 19 | −153.438 | 4.70 | 1.49700 | 81.6 |
| 20 | −52.229 | 0.10 | | |
| 21 | 79.355 | 7.50 | 1.48749 | 70.2 |
| 22 | −50.297 | 2.00 | 1.81600 | 46.6 |
| 23 | −230.428 | — | | |

TABLE 8

ZOOM LENS SYSTEM DATA
Zoom Ratio: 1.89

| | Short Focal Length Extremity | Intermediate Focal Length | Long Focal Length Extremity |
|---|---|---|---|
| FNO. | 4.6 | 4.6 | 4.6 |
| f | 82.40 | 105.00 | 156.00 |
| W | 18.8 | 14.8 | 10.0 |
| Y | 27.75 | 27.75 | 27.75 |
| fB | 86.98 | 92.67 | 104.95 |
| L | 278.03 | 251.97 | 228.03 |
| d6 | 75.38 | 43.63 | 7.41 |
| d14 | 5.00 | 10.69 | 22.97 |
| d18 | 34.42 | 28.72 | 16.45 |

TABLE 9

LENS GROUP DATA

| Lens Group | 1st Surf. | Focal Length |
|---|---|---|
| 1 | 1 | −125.36 |
| 2 | 7 | 65.52 |
| 3 | 16 | −71.76 |
| 4 | 19 | 102.87 |

Numerical Embodiment 4

Figure 19:
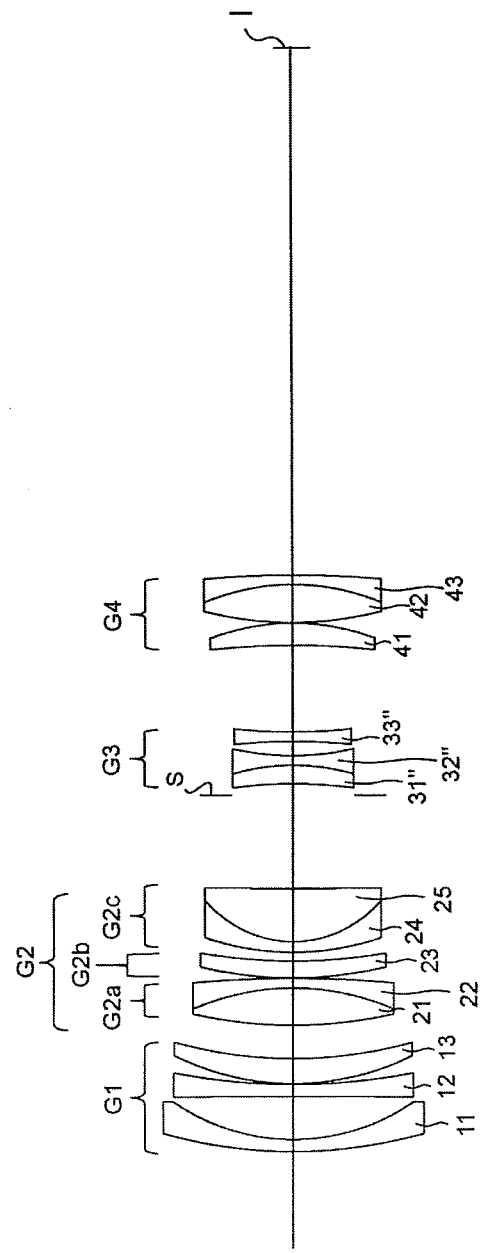
FIG. 19 shows a lens arrangement of a fourth numerical embodiment of a zoom lens system, according to the present invention, at the long focal length extremity when focused on an object at infinity.
Figure 22:
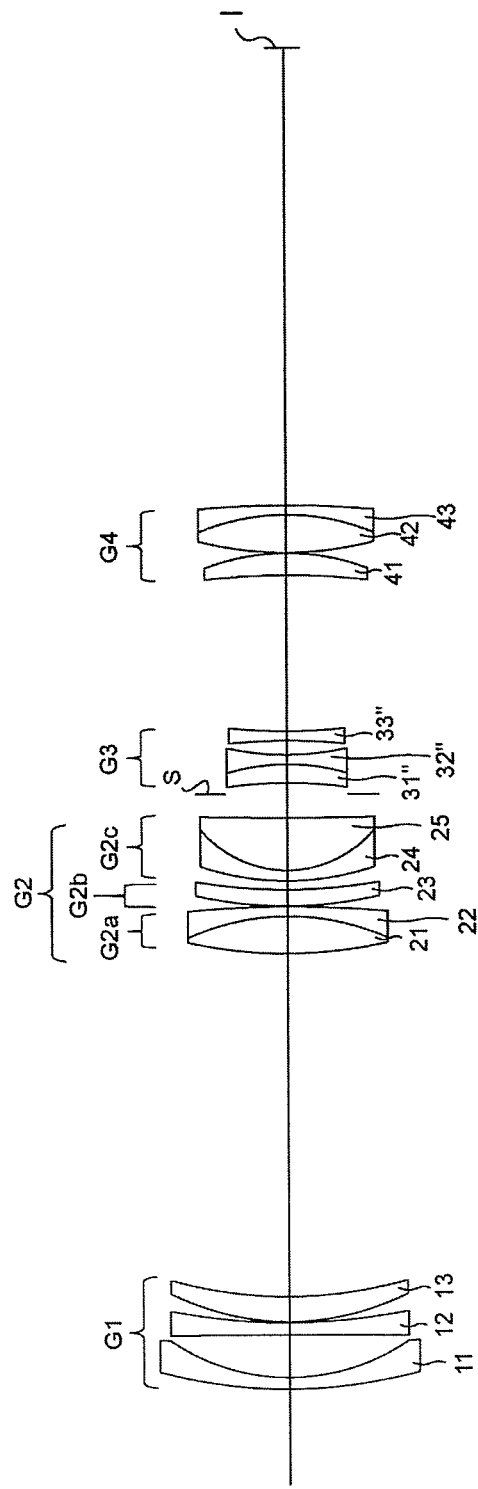
FIG. 22 shows a lens arrangement of the fourth numerical embodiment of the zoom lens system, according to the present invention, at the short focal length extremity when focused on an object at infinity.
Figures 23A, 23B, 23C, 23D:
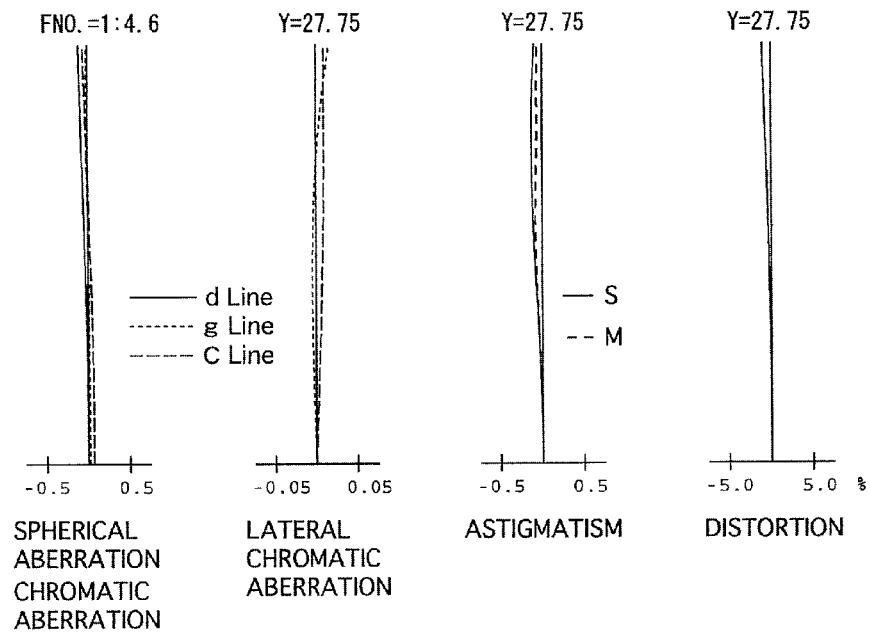
FIGS. 23A, 23B, 23C and 23D show various aberrations that occurred in the lens arrangement shown in FIG. 22.
Figure 24A:
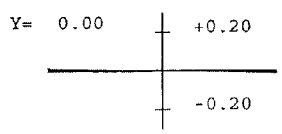
FIGS. 24A, 24B and 24C show various lateral aberrations that occurred in the lens arrangement shown in FIG. 22.
Figure 24B:
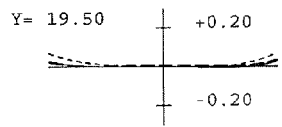
Figure 24C:
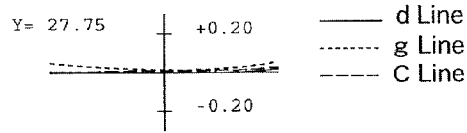

FIGS. 19 through 24C and Tables 10 through 12 show a fourth numerical embodiment of a zoom lens system according to the present invention. FIG. 19 shows a lens arrangement of the fourth numerical embodiment of the zoom lens system at the long focal length extremity when focused on an object at infinity. FIGS. 20A, 20B, 20C and 20D show various aberrations that occurred in the lens arrangement shown in FIG. 19. FIGS. 21A, 21B and 21C show lateral aberrations that occurred in the lens arrangement shown in FIG. 19. FIG. 22 shows a lens arrangement of the fourth numerical embodiment of the zoom lens system at the short focal length extremity when focused on an object at infinity. FIGS. 23A, 23B, 23C and 23D show various aberrations that occurred in the lens arrangement shown in FIG. 22. FIGS. 24A, 24B and 24C show lateral aberrations that occurred in the lens arrangement shown in FIG. 22. Table 10 shows the lens surface data, Table 11 shows various data of the zoom lens system, and Table 12 shows various data of the lens groups.

The lens arrangement of the fourth numerical embodiment is the same as that of the first numerical embodiment except for the following configurations:

(1) The positive lens element 21 of the second lens group G2 is a biconvex positive lens element.

(2) The third lens group G3 is configured of a cemented lens provided with a positive meniscus lens element 31" having a convex surface on the image side and a biconcave negative lens element 32"; and a biconcave negative lens element 33", in that order from the object side.

(3) The biconvex positive lens element 42 and the negative meniscus lens element 43 of the fourth lens group G4 are bonded together to form a cemented lens.

TABLE 10

SURFACE DATA

| Surf. No. | R | d | N(d) | ν(d) |
|---|---|---|---|---|
| 1 | 106.208 | 2.50 | 1.69680 | 55.5 |
| 2 | 46.140 | 8.99 | | |
| 3 | −1818.168 | 2.50 | 1.69680 | 55.5 |
| 4 | 133.948 | 0.20 | | |
| 5 | 58.265 | 5.25 | 1.80518 | 25.4 |
| 6 | 96.187 | d6 | | |
| 7 | 100.538 | 7.83 | 1.74100 | 52.7 |
| 8 | −53.696 | 2.00 | 1.80610 | 33.3 |
| 9 | −239.970 | 0.11 | | |
| 10 | 89.314 | 3.50 | 1.69680 | 55.5 |
| 11 | 119.038 | 1.85 | | |
| 12 | 60.103 | 2.20 | 1.56732 | 42.8 |
| 13 | 24.931 | 11.10 | 1.49700 | 81.6 |
| 14 | 907.113 | d14 | | |
| 15 (Diaphragm) | ∞ | 2.40 | | |
| 16 | −94.582 | 3.92 | 1.84666 | 23.8 |
| 17 | −47.023 | 2.00 | 1.51823 | 59.0 |
| 18 | 59.325 | 3.00 | | |
| 19 | −125.000 | 2.00 | 1.48749 | 70.2 |
| 20 | 125.000 | d20 | | |
| 21 | −160.204 | 4.70 | 1.49700 | 81.6 |
| 22 | −49.856 | 0.10 | | |
| 23 | 76.802 | 8.00 | 1.48749 | 70.2 |
| 24 | −50.609 | 2.00 | 1.80610 | 40.9 |
| 25 | −212.723 | — | | |

TABLE 11

ZOOM LENS SYSTEM DATA
Zoom Ratio: 1.89

|  | Short Focal Length Extremity | Intermediate Focal Length | Long Focal Length Extremity |
|---|---|---|---|
| FNO. | 4.6 | 4.6 | 4.6 |
| f | 82.40 | 105.00 | 156.00 |
| W | 18.8 | 14.8 | 10.0 |
| Y | 27.75 | 27.75 | 27.75 |
| fB | 94.92 | 99.64 | 109.65 |
| L | 280.71 | 255.31 | 230.70 |
| d6 | 71.75 | 41.64 | 7.02 |
| d14 | 5.00 | 9.72 | 19.73 |
| d20 | 32.88 | 28.16 | 18.15 |

TABLE 12

LENS GROUP DATA

| Lens Group | 1$^{st}$ Surf. | Focal Length |
|---|---|---|
| 1 | 1 | −117.52 |
| 2 | 7 | 58.34 |
| 3 | 16 | −52.48 |
| 4 | 21 | 91.01 |

Numerical Embodiment 5

Figure 25:
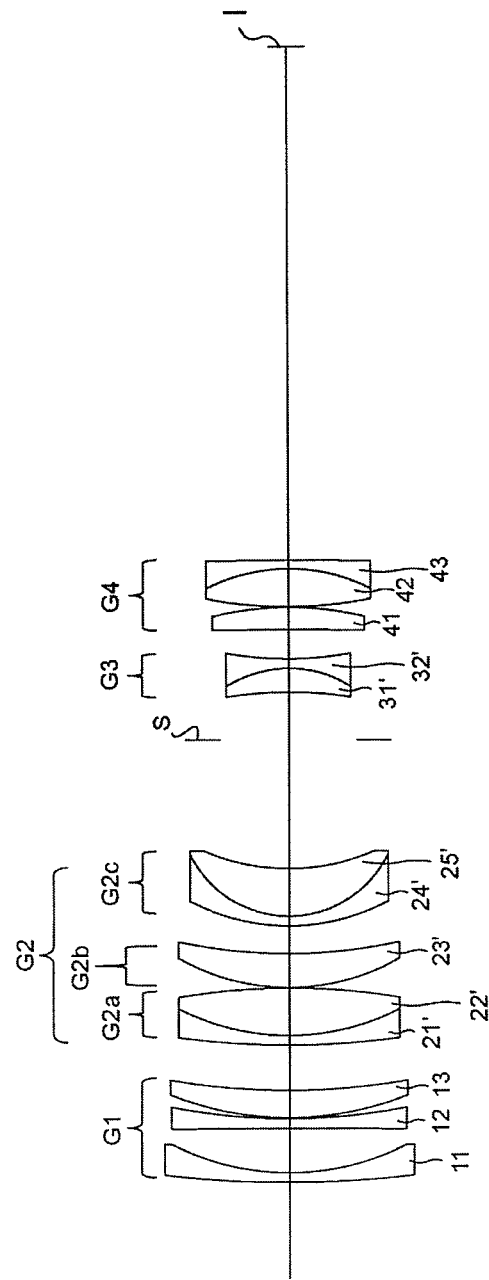
FIG. 25 shows a lens arrangement of a fifth numerical embodiment of a zoom lens system, according to the present invention, at the long focal length extremity when focused on an object at infinity.

FIGS. 25 through 30C and Tables 13 through 15 show a fifth numerical embodiment of a zoom lens system according to the present invention. FIG. 25 shows a lens arrangement of the fifth numerical embodiment of the zoom lens system at the long focal length extremity when focused on an object at infinity. FIGS. 26A, 26B, 26C and 26D show various aberrations that occurred in the lens arrangement shown in FIG. 25. FIGS. 27A, 27B and 27C show lateral aberrations that occurred in the lens arrangement shown in FIG. 25. FIG. 28 shows a lens arrangement of the fifth numerical embodiment of the zoom lens system at the short focal length extremity when focused on an object at infinity. FIGS. 29A, 29B, 29C and 29D show various aberrations that occurred in the lens arrangement shown in FIG. 28. FIGS. 30A, 30B and 30C show lateral aberrations that occurred in the lens arrangement shown in FIG. 28. Table 13 shows the lens surface data, Table 14 shows various data of the zoom lens system, and Table 15 shows various data of the lens groups.

The lens arrangement of the fifth numerical embodiment is the same as that of the first numerical embodiment except for the following configurations:

(1) The second lens group G2 is configured of a negative meniscus lens element 21' having a convex surface on the object side, a biconvex positive lens element 22', a positive meniscus lens element 23' having a convex surface on the object side, a negative meniscus lens element 24' having a convex surface on the object side, and a positive meniscus lens element 25' having a convex surface on the object side, in that order from the object side. The surface on the image side of the negative meniscus lens element 21' and the surface on the object side of the biconvex positive lens element 22' are bonded together. The surface on the image side of the negative meniscus lens element 24' and the surface on the object side of the positive meniscus lens element 25' are bonded together. The negative meniscus lens element 21' and the biconvex positive lens element 22' constitute a positive first sub-lens group G2a, the positive meniscus lens element 23' constitutes a positive second sub-lens group G2b, and the negative meniscus lens element 24' and the positive meniscus lens element 25' constitute a third sub-lens group G2c.

(2) The third lens group G3 is a cemented lens provided with a positive meniscus lens element 31' having a convex surface on the image side, and a biconcave negative lens element 32', in that order from the object side.

(3) The biconvex positive lens element 42 and the negative meniscus lens element 43 of the fourth lens group G4 are bonded together to form a cemented lens.

TABLE 13

SURFACE DATA

| Surf. No. | R | d | N(d) | ν(d) |
|---|---|---|---|---|
| 1 | 233.227 | 2.00 | 1.77250 | 49.6 |
| 2 | 55.967 | 9.31 | | |
| 3 | −1741.087 | 2.00 | 1.61800 | 63.4 |
| 4 | 131.615 | 0.20 | | |
| 5 | 69.429 | 5.75 | 1.80518 | 25.4 |
| 6 | 150.627 | d6 | | |
| 7 | 179.177 | 2.00 | 1.80000 | 29.9 |
| 8 | 52.811 | 9.90 | 1.69680 | 55.5 |
| 9 | −143.444 | 0.10 | | |
| 10 | 48.133 | 7.10 | 1.61800 | 63.4 |
| 11 | 112.834 | 5.81 | | |
| 12 | 45.585 | 2.00 | 1.65844 | 50.9 |
| 13 | 23.718 | 10.00 | 1.49700 | 81.6 |
| 14 | 45.752 | d14 | | |
| 15 (Diaphragm) | ∞ | 10.05 | | |
| 16 | −87.532 | 5.00 | 1.80610 | 33.3 |
| 17 | −24.997 | 2.00 | 1.72916 | 54.7 |
| 18 | 73.310 | d18 | | |
| 19 | −690.221 | 4.78 | 1.49700 | 81.6 |
| 20 | −67.844 | 0.10 | | |
| 21 | 90.741 | 7.96 | 1.61800 | 63.4 |
| 22 | −38.978 | 1.80 | 1.67300 | 38.2 |
| 23 | −1261.634 | — | | |

TABLE 14

ZOOM LENS SYSTEM DATA
Zoom Ratio: 1.88

|  | Short Focal Length Extremity | Intermediate Focal Length | Long Focal Length Extremity |
|---|---|---|---|
| FNO. | 4.6 | 4.6 | 4.6 |
| f | 92.70 | 125.00 | 174.60 |
| W | 16.9 | 12.5 | 8.9 |
| Y | 27.75 | 27.75 | 27.75 |
| fB | 94.20 | 103.74 | 116.44 |
| L | 266.07 | 251.59 | 246.95 |
| d6 | 50.79 | 26.77 | 9.43 |
| d14 | 4.75 | 14.29 | 26.99 |
| d18 | 28.47 | 18.93 | 6.23 |

TABLE 15

LENS GROUP DATA

| Lens Group | 1$^{st}$ Surf. | Focal Length |
|---|---|---|
| 1 | 1 | −109.43 |
| 2 | 7 | 69.01 |
| 3 | 16 | −61.27 |
| 4 | 19 | 79.26 |

Numerical Embodiment 6

Figure 31:
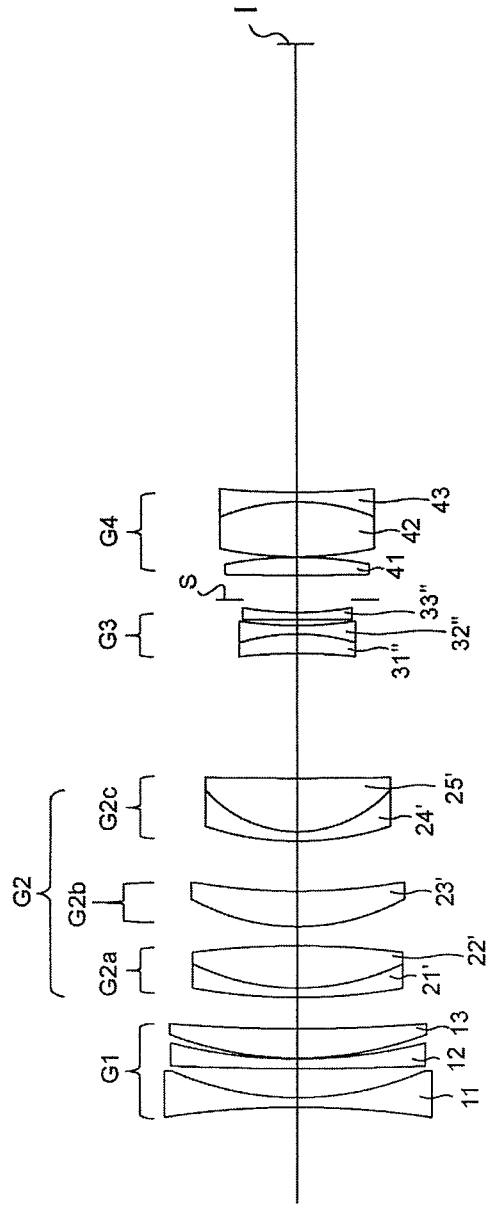
FIG. 31 shows a lens arrangement of a sixth numerical embodiment of a zoom lens system, according to the present invention, at the long focal length extremity when focused on an object at infinity.
Figures 32A, 32B, 32C, 32D:
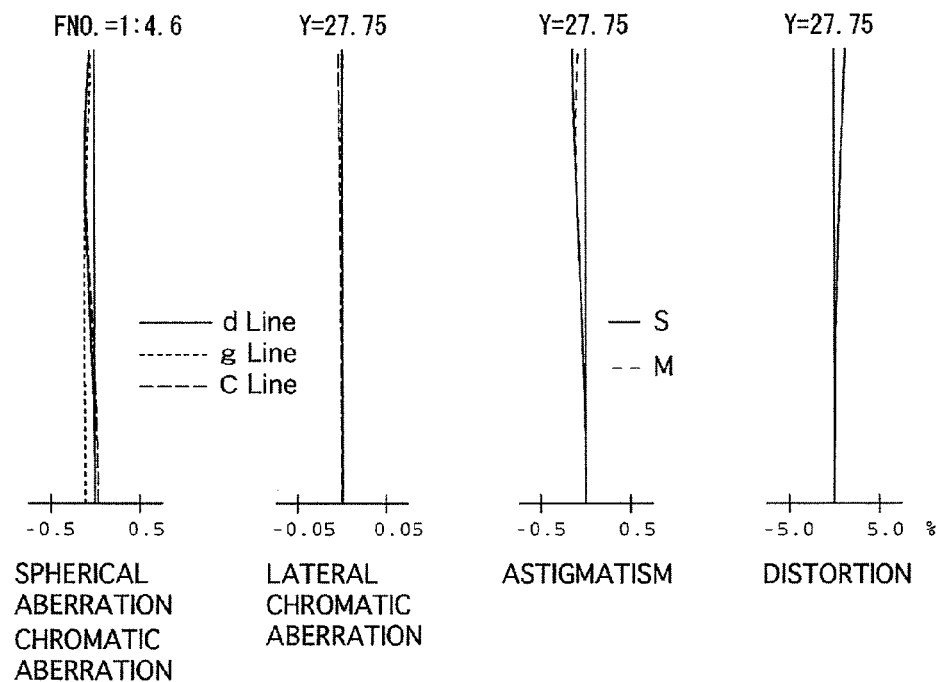
FIGS. 32A, 32B, 32C and 32D show various aberrations that occurred in the lens arrangement shown in FIG. 31.
Figure 33A:
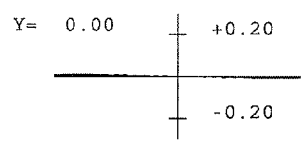
FIGS. 33A, 33B and 33C show various lateral aberrations that occurred in the lens arrangement shown in FIG. 31.
Figure 33B:
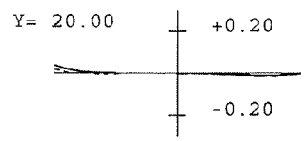
Figure 33C:
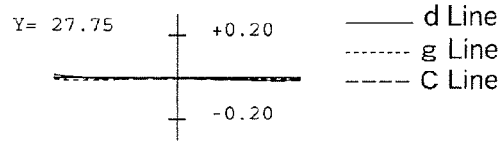
Figure 34:
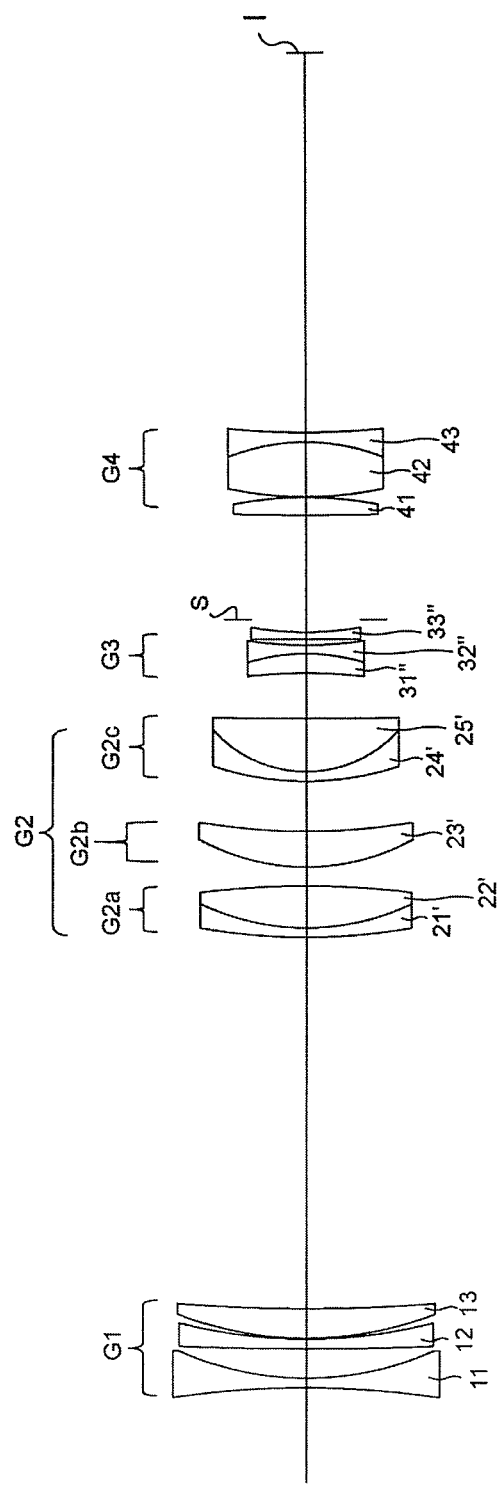
FIG. 34 shows a lens arrangement of the sixth numerical embodiment of the zoom lens system, according to the present invention, at the short focal length extremity when focused on an object at infinity.
Figures 35A, 35B, 35C, 35D:
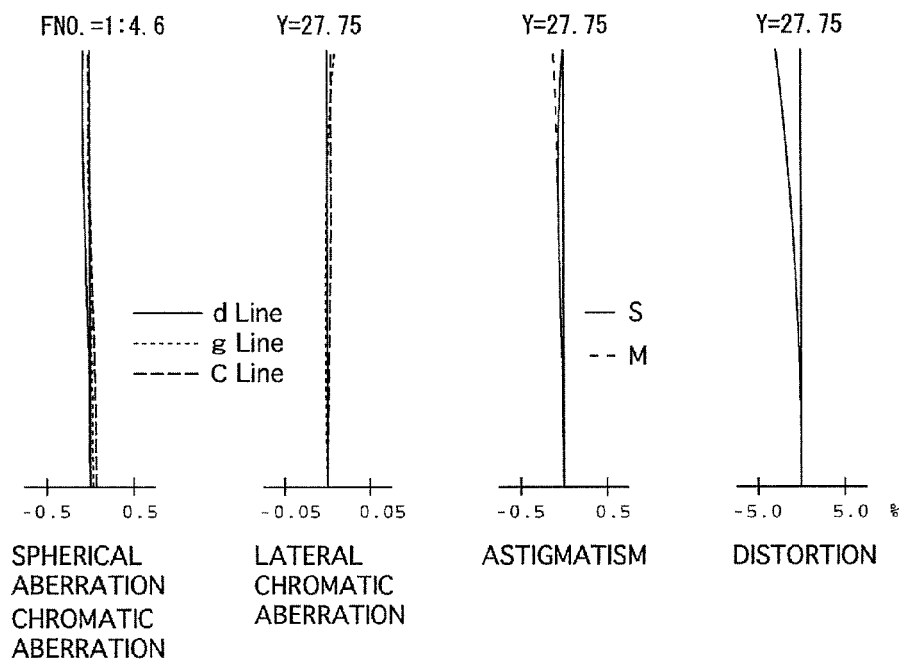
FIGS. 35A, 35B, 35C and 35D show various aberrations that occurred in the lens arrangement shown in FIG. 34.
Figure 36A:
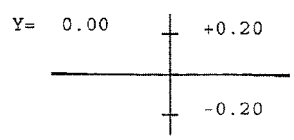
FIGS. 36A, 36B and 36C show various lateral aberrations that occurred in the lens arrangement shown in FIG. 34.
Figure 36B:
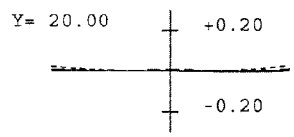
Figure 36C:
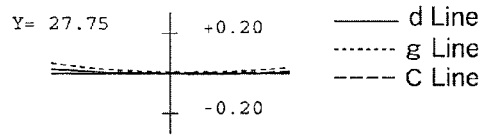

FIGS. 31 through 36C and Tables 16 through 18 show a sixth numerical embodiment of a zoom lens system according to the present invention. FIG. 31 shows a lens arrangement of the sixth numerical embodiment of the zoom lens system at the long focal length extremity when focused on an object at infinity. FIGS. 32A, 32B, 32C and 32D show various aberrations that occurred in the lens arrangement shown in FIG. 31. FIGS. 33A, 33B and 33C show lateral aberrations that occurred in the lens arrangement shown in FIG. 31. FIG. 34 shows a lens arrangement of the sixth numerical embodiment of the zoom lens system at the short focal length extremity when focused on an object at infinity. FIGS. 35A, 35B, 35C and 35D show various aberrations that occurred in the lens arrangement shown in FIG. 34. FIGS. 36A, 36B and 36C show lateral aberrations that occurred in the lens arrangement shown in FIG. 34. Table 16 shows the lens surface data, Table 17 shows various data of the zoom lens system, and Table 18 shows various data of the lens groups.

The lens arrangement of the sixth numerical embodiment is the same as that of the first numerical embodiment except for the following configurations:

(1) In the first lens group G1, the negative lens element 11 is a biconcave negative lens element and the negative lens element 12 is a negative meniscus lens element having a convex surface on the object side.

(2) The second lens group G2 is configured of a negative meniscus lens element 21' having a convex surface on the object side, a biconvex positive lens element 22', a positive meniscus lens element 23' having a convex surface on the object side, a negative meniscus lens element 24' having a convex surface on the object side, and a positive meniscus lens element 25' having a convex surface on the object side, in that order from the object side. The surface on the image side of the negative meniscus lens element 21' and the surface on the object side of the biconvex positive lens element 22' are bonded together. The surface on the image side of the negative meniscus lens element 24' and the surface on the object side of the positive meniscus lens element 25' are bonded together. The negative meniscus lens element 21' and the biconvex positive lens element 22' constitute a positive first sub-lens group G2a, the positive meniscus lens element 23' constitutes a positive second sub-lens group G2b, and the negative meniscus lens element 24' and the positive meniscus lens element 25' constitute a third sub-lens group G2c.

(3) The third lens group G3 is configured of a cemented lens provided with a positive meniscus lens element 31" having a convex surface on the image side and a biconcave negative lens element 32"; and a biconcave negative lens element 33", in that order from the object side.

(4) In the fourth lens group G4, the positive lens element 41 is a biconvex positive lens element, the negative lens element 43 is a biconcave negative lens element, and the biconvex positive lens element 42 and the biconcave negative lens element 43 are bonded together to form a cemented lens.

(5) A diaphragm S is provided between the third lens group G3 and the fourth lens group G4. This diaphragm S remains stationary (in the optical axis direction) with respect to the imaging plane I and does not decenter (move in a plane orthogonal to the optical axis) during an image-stabilizing operation.

TABLE 16

SURFACE DATA

| Surf. No. | R | d | N(d) | v(d) |
|---|---|---|---|---|
| 1 | −193.648 | 2.00 | 1.57099 | 50.8 |
| 2 | 68.408 | 6.07 | | |

TABLE 16-continued

SURFACE DATA

| Surf. No. | R | d | N(d) | v(d) |
|---|---|---|---|---|
| 3 | 713.918 | 2.00 | 1.65412 | 39.7 |
| 4 | 111.431 | 0.20 | | |
| 5 | 78.286 | 6.15 | 1.80518 | 25.4 |
| 6 | 371.084 | d6 | | |
| 7 | 129.431 | 2.00 | 1.80000 | 29.9 |
| 8 | 52.718 | 8.88 | 1.60311 | 60.7 |
| 9 | −185.627 | 3.99 | | |
| 10 | 47.652 | 7.50 | 1.61800 | 63.4 |
| 11 | 134.624 | 10.55 | | |
| 12 | 64.505 | 2.00 | 1.77250 | 49.6 |
| 13 | 26.895 | 11.22 | 1.49700 | 81.6 |
| 14 | 1101.864 | d14 | | |
| 15 | −117.571 | 4.11 | 1.80518 | 25.4 |
| 16 | −43.018 | 1.80 | 1.60311 | 60.7 |
| 17 | 81.085 | 1.27 | | |
| 18 | −1247.411 | 1.50 | 1.51633 | 64.1 |
| 19 | 68.875 | 2.70 | | |
| 20 (Diaphragm) | ∞ | d20 | | |
| 21 | 697.984 | 3.74 | 1.49700 | 81.6 |
| 22 | −82.282 | 0.10 | | |
| 23 | 80.815 | 11.50 | 1.60738 | 56.8 |
| 24 | −45.830 | 2.00 | 1.66998 | 39.3 |
| 25 | 177.985 | — | | |

TABLE 17

ZOOM LENS SYSTEM DATA
Zoom Ratio: 1.88

| | Short Focal Length Extremity | Intermediate Focal Length | Long Focal Length Extremity |
|---|---|---|---|
| FNO. | 4.6 | 4.6 | 4.6 |
| f | 92.70 | 125.00 | 174.60 |
| W | 17.1 | 12.6 | 8.9 |
| Y | 27.75 | 27.75 | 27.75 |
| fB | 77.40 | 84.26 | 94.06 |
| L | 277.81 | 244.76 | 223.25 |
| d6 | 77.71 | 37.80 | 6.50 |
| d14 | 9.61 | 16.46 | 26.26 |
| d20 | 21.81 | 14.95 | 5.16 |

TABLE 18

LENS GROUP DATA

| Lens Group | 1st Surf. | Focal Length |
|---|---|---|
| 1 | 1 | −126.23 |
| 2 | 7 | 65.31 |
| 3 | 15 | −55.95 |
| 4 | 21 | 103.07 |

The numerical values of each condition for each embodiment are shown in Table 19.

TABLE 19

| | Embod. 1 | Embod. 2 | Embod. 3 |
|---|---|---|---|
| Cond. (1) | −1.720 | −1.683 | −1.913 |
| Cond. (2) | −0.47 | −0.38 | −0.47 |
| Cond. (3) | 0.97 | 1.30 | 1.05 |
| Cond. (4) | 1.80610 | 1.80440 | 1.85026 |
| Cond. (5) | 40.9 | 39.6 | 32.3 |
| Cond. (6) | 1.60311 | 1.60311 | 1.62299 |
| Cond. (7) | 60.7 | 60.7 | 58.2 |
| Cond. (8) | | | |
| Ndn2 | 1.51742 | 1.51742 | 1.54072 |

TABLE 19-continued

| | | | |
|---|---|---|---|
| Ndp2 | 1.49700 | 1.49700 | 1.49700 |
| Cond. (9) | 81.6 | 81.6 | 81.6 |
| Cond. (10) | 1.23 | 1.56 | 1.75 |
| Cond. (11) | 81.6 | 81.6 | 81.6 |
| | Embod. 4 | Embod. 5 | Embod. 6 |
| Cond. (1) | −2.014 | −1.586 | −1.933 |
| Cond. (2) | −0.37 | −0.19 | −0.26 |
| Cond. (3) | 0.95 | 1.63 | 0.91 |
| Cond. (4) | 1.84666 | 1.80610 | 1.80518 |
| Cond. (5) | 23.8 | 33.3 | 25.4 |
| Cond. (6) | 1.51823 | 1.72916 | 1.60311 |
| Cond. (7) | 59.0 | 54.7 | 60.7 |
| Cond. (8) | | | |
| Ndn2 | 1.56732 | 1.65844 | 1.77250 |
| Ndp2 | 1.49700 | 1.49700 | 1.49700 |
| Cond. (9) | 81.6 | 81.6 | 81.6 |
| Cond. (10) | 2.24 | 1.79 | 2.26 |
| Cond. (11) | 81.6 | 81.6 | 81.6 |

As can be understood from Table 19, the first through sixth embodiments satisfy conditions (1) through (11). Furthermore, as can be understood from the various aberration diagrams and lateral aberration diagrams, the various aberrations and the lateral aberrations are suitably corrected.

The technical scope of the present invention cannot be bypassed by adding a lens element or lens group, which, in effect, has practically no optical power, to a zoom lens system which is included in the technical scope of the present invention.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a negative first lens group, a positive second lens group, a negative third lens group, and a positive fourth lens group, in that order from the object side,
   wherein upon zooming from the short focal length extremity to the long focal length extremity, the distance between said first lens group and said second lens group decreases, the distance between said second lens group and said third lens group increases, and the distance between said third lens group and said fourth lens group decreases,
   wherein said third lens group includes a cemented lens provided with a positive lens element and a negative lens element, and
   wherein the following conditions (1) and (2) are satisfied:

$$-2.50 < f1/f2 < -1.57 \quad (1),$$

and $$f3/f3B < -0.1 \quad (2),$$

wherein
   f1 designates the focal length of said first lens group,
   f2 designates the focal length of said second lens group,
   f3 designates the focal length of said third lens group, and
   f3B designates the focal length of a bonding surface in the cemented lens of said third lens group,
   wherein said fourth lens group comprises a positive lens element having a convex surface on the image side, a positive lens element having a convex surface on the image side, and a negative lens element having a concave surface on the object side, in that order from the object side, and
   wherein the following condition (11) is satisfied:

$$vdp4 > 80 \quad (11),$$

wherein
   vdp4 designates the Abbe number with respect to the d-line of the positive lens element provided with a convex surface on the image side that is provided closest to the object side within said fourth lens group.

2. The zoom lens system according to claim 1, wherein the following condition (3) is satisfied:

$$0.9 < f12t/f4 < 3.0 \quad (3),$$

wherein
   f12t designates the combined focal length of said first lens group and said second lens group at the long focal length extremity, and
   f4 designates the focal length of said fourth lens group.

3. The zoom lens system according to claim 1, wherein the following conditions (4), (5), (6) and (7) are satisfied:

$$Ndp3 > 1.8 \quad (4),$$

$$vdp3 < 45 \quad (5),$$

$$Ndn3 < 1.75 \quad (6),$$

and $$vdn3 > 50 \quad (7),$$

wherein
   Ndp3 designates the refractive index at the d-line of the positive lens element of the cemented lens of said third lens group,
   vdp3 designates the Abbe number with respect to the d-line of the positive lens element of the cemented lens of said third lens group,
   Ndn3 designates the refractive index at the d-line of the negative lens element of the cemented lens of said third lens group, and
   vdn3 designates the Abbe number with respect to the d-line of the negative lens element of the cemented lens of said third lens group.

4. A zoom lens system comprising a negative first lens group, a positive second lens group, a negative third lens group, and a positive fourth lens group, in that order from the object side,
   wherein upon zooming from the short focal length extremity to the long focal length extremity, the distance between said first lens group and said second lens group decreases, the distance between said second lens group and said third lens group increases, and the distance between said third lens group and said fourth lens group decreases, and
   wherein the following conditions (1) and (3) are satisfied:

$$-2.50 < f1/f2 < -1.57 \quad (1),$$

and $$0.9 < f12t/f4 < 3.0 \quad (3),$$

wherein
   f1 designates the focal length of said first lens group,
   f2 designates the focal length of said second lens group,
   f12t designates the combined focal length of said first lens group and said second lens group at the long focal length extremity, and
   f4 designates the focal length of said fourth lens group,
   wherein said fourth lens group comprises a positive lens element having a convex surface on the image side, a positive lens element having a convex surface on the image side, and a negative lens element having a concave surface on the object side, in that order from the object side, and wherein the following condition (11) is satisfied:

$$vdp4>80 \qquad (11),$$

wherein
vdp4 designates the Abbe number with respect to the d-line of the positive lens element provided with a convex surface on the image side that is provided closest to the object side within said fourth lens group.

5. The zoom lens system according to claim 1, wherein a cemented lens, which is provided with a negative meniscus lens element having a convex surface on the object side and a positive meniscus lens element having a convex surface on the object side, in that order from the object side, is provided closest to the image side within said second lens group.

6. The zoom lens system according to claim 5, wherein the following conditions (8) and (9) are satisfied:

$$Ndn2>Ndp2 \qquad (8),$$

and $$vdp2>80 \qquad (9),$$

wherein
Ndn2 designates the refractive index at the d-line of the negative meniscus lens element of said cemented lens provided in said second lens group,
Ndp2 designates the refractive index at the d-line of the positive meniscus lens element of said cemented lens provided in said second lens group, and
vdp2 designates the Abbe number with respect to the d-line of the positive meniscus lens element of said cemented lens provided in said second lens group.

7. A zoom lens system comprising a negative first lens group, a positive second lens group, a negative third lens group, and a positive fourth lens group, in that order from the object side,
wherein upon zooming from the short focal length extremity to the long focal length extremity, the distance between said first lens group and said second lens group decreases, the distance between said second lens group and said third lens group increases, and the distance between said third lens group and said fourth lens group decreases,
wherein said second lens group includes a positive first sub-lens group, a positive second sub-lens group and a third sub-lens group, in that order from the object side, and
wherein said third sub-lens group includes a cemented lens, provided with a negative meniscus lens element having a convex surface on the object side and a positive meniscus lens element having a convex surface on the object side, in that order from the object side,
wherein the following conditions (8) and (9) are satisfied:

$$Ndn2>Ndp2 \qquad (8),$$

and $$vdp2>80 \qquad (9),$$

wherein
Ndn2 designates the refractive index at the d-line of the negative meniscus lens element of said cemented lens provided in said third sub-lens group of said second lens group,
Ndp2 designates the refractive index at the d-line of the positive meniscus lens element of said cemented lens provided in said third sub-lens group of said second lens group, and
vdp2 designates the Abbe number with respect to the d-line of the positive meniscus lens element of said cemented lens provided in said third sub-lens group of said second lens group.

8. The zoom lens system according to claim 1, wherein the following condition (10) is satisfied:

$$1.2<f1/f3<2.5 \qquad (10),$$

wherein
f1 designates the focal length of said first lens group, and
f3 designates the focal length of said third lens group.

9. The zoom lens system according to claim 1, wherein said third lens group remains stationary in the optical axis direction with respect to the imaging plane during zooming from the short focal length extremity to the long focal length extremity.

10. The zoom lens system according to claim 4, wherein a cemented lens, which is provided with a negative meniscus lens element having a convex surface on the object side and a positive meniscus lens element having a convex surface on the object side, in that order from the object side, is provided closest to the image side within said second lens group.

11. The zoom lens system according to claim 10, wherein the following conditions (8) and (9) are satisfied:

$$Ndn2>Ndp2 \qquad (8),$$

and $$vdp2>80 \qquad (9),$$

wherein
Ndn2 designates the refractive index at the d-line of the negative meniscus lens element of said cemented lens provided in said second lens group,
Ndp2 designates the refractive index at the d-line of the positive meniscus lens element of said cemented lens provided in said second lens group, and
vdp2 designates the Abbe number with respect to the d-line of the positive meniscus lens element of said cemented lens provided in said second lens group.

12. The zoom lens system according to claim 4, wherein the following condition (10) is satisfied:

$$1.2<f1/f3<2.5 \qquad (10),$$

wherein
f1 designates the focal length of said first lens group, and
f3 designates the focal length of said third lens group.

13. The zoom lens system according to claim 4, wherein said third lens group remains stationary in the optical axis direction with respect to the imaging plane during zooming from the short focal length extremity to the long focal length extremity.

14. The zoom lens system according to claim 7, wherein the following condition (10) is satisfied:

$$1.2<f1/f3<2.5 \qquad (10),$$

wherein
f1 designates the focal length of said first lens group, and
f3 designates the focal length of said third lens group.

15. The zoom lens system according to claim 7, wherein said third lens group remains stationary in the optical axis direction with respect to the imaging plane during zooming from the short focal length extremity to the long focal length extremity.

16. The zoom lens system according to claim 7, wherein said fourth lens group comprises a positive lens element having a convex surface on the image side, a positive lens element having a convex surface on the image side, and a negative lens element having a concave surface on the object side, in that order from the object side.

17. The zoom lens system according to claim 16, wherein the following condition (11) is satisfied:

$$\nu dp4 > 80 \quad (11),$$

wherein $\nu dp4$ designates the Abbe number with respect to the d-line of the positive lens element provided with a convex surface on the image side that is provided closest to the object side within said fourth lens group.

* * * * *